United States Patent
Kumar et al.

(10) Patent No.: US 12,438,665 B2
(45) Date of Patent: Oct. 7, 2025

(54) DYNAMIC ADDITIONAL DEMODULATION REFERENCE SIGNAL CONFIGURATION

(71) Applicant: Dell Products L.P., Round Rock, TX (US)

(72) Inventors: Sunil Kumar, Bangalore (IN); Mudit Gupta, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 331 days.

(21) Appl. No.: 17/812,261

(22) Filed: Jul. 13, 2022

(65) Prior Publication Data

US 2024/0022371 A1    Jan. 18, 2024

(51) Int. Cl.
*H04L 5/00* (2006.01)
*H04L 1/1812* (2023.01)

(52) U.S. Cl.
CPC .......... *H04L 5/0051* (2013.01); *H04L 1/1812* (2013.01)

(58) Field of Classification Search
CPC .... H04L 5/0051; H04L 1/1812; H04L 1/1671
See application file for complete search history.

(56) References Cited

U.S. PATENT DOCUMENTS

| | | | |
|---|---|---|---|
| 11,336,419 B2 | 5/2022 | Wang et al. | |
| 2015/0304080 A1 | 10/2015 | Yi et al. | |
| 2016/0127932 A1 | 5/2016 | Cosimini et al. | |
| 2016/0212737 A1 | 7/2016 | Jang et al. | |
| 2018/0270103 A1* | 9/2018 | Chapman | H04L 43/0847 |
| 2019/0223176 A1 | 7/2019 | Liu et al. | |

(Continued)

FOREIGN PATENT DOCUMENTS

| WO | 2018229955 | 12/2018 |
|---|---|---|
| WO | 2019/032296 | 2/2019 |

(Continued)

OTHER PUBLICATIONS

International Search Report and Written Opinion mailed Apr. 19, 2024 for PCT Application No. PCT/US2023/035945, 17 pages.

(Continued)

*Primary Examiner* — Ian N Moore
*Assistant Examiner* — Latresa A McCallum
(74) *Attorney, Agent, or Firm* — Amin, Turocy & Watson, LLP

(57) ABSTRACT

A system can facilitate first broadband cellular communications between a user equipment and core network equipment according to a first number of additional demodulation reference signal (DMRS) positions. The system can determine to modify the first number of additional DMRS positions. The system can, based on determining to modify the first number of additional DMRS positions, send, to the user equipment, physical downlink control channel downlink control information that indicates a second number of additional DMRS positions that are configured in the downlink control information. The system can facilitate second broadband cellular communications between the user equipment and the core network equipment according to the second number of additional DMRS positions, wherein a throughput of the second broadband cellular communications is determined as a function of a size of a transport block set based on the second number of additional DMRS positions.

20 Claims, 19 Drawing Sheets

(56) References Cited

U.S. PATENT DOCUMENTS

| | | | |
|---|---|---|---|
| 2019/0349023 A1 | 11/2019 | Ge et al. | |
| 2020/0052802 A1 | 2/2020 | Ryu et al. | |
| 2020/0229185 A1 | 7/2020 | Zhang et al. | |
| 2020/0314960 A1 | 10/2020 | Basu Mallick et al. | |
| 2020/0328861 A1* | 10/2020 | Malladi | H04L 5/0069 |
| 2021/0075571 A1* | 3/2021 | Manolakos | H04W 72/23 |
| 2021/0153171 A1 | 5/2021 | Saito et al. | |
| 2021/0250753 A1* | 8/2021 | Hosseini | H04L 5/001 |
| 2022/0078872 A1 | 3/2022 | Shrestha et al. | |
| 2022/0123853 A1* | 4/2022 | Chandran | H04L 5/0085 |
| 2022/0159757 A1 | 5/2022 | Balasubramanian et al. | |
| 2022/0166566 A1* | 5/2022 | Kumar | H04L 5/0094 |
| 2022/0286253 A1 | 9/2022 | Chae et al. | |
| 2023/0006762 A1 | 1/2023 | Levitsky et al. | |
| 2023/0216711 A1 | 7/2023 | Yao et al. | |
| 2023/0353306 A1 | 11/2023 | Ren et al. | |
| 2023/0371030 A1 | 11/2023 | Wang et al. | |
| 2023/0379926 A1 | 11/2023 | Pardhasarathy et al. | |
| 2023/0379927 A1 | 11/2023 | Agarwal et al. | |
| 2023/0379930 A1 | 11/2023 | Chacko et al. | |
| 2024/0187182 A1 | 6/2024 | Shukla | |

FOREIGN PATENT DOCUMENTS

| | | |
|---|---|---|
| WO | 2021/243481 | 12/2021 |
| WO | 2022/031919 | 2/2022 |
| WO | 2023/048330 | 3/2023 |

OTHER PUBLICATIONS

Moderator (Huawei): "Summary#I of efficient SCell activation/de-activation mechanism of NR CA", 3GPP Draft; R1-2103886, RAN WG1, No. E-meeting; Apr. 20, 2021, [https://ftp.3gpp.org/tsg_ran/WG1_RL1/T SGR1_104b-e/Inbox/R1-2103886.zip RI-2103886 Sumniary#2 of SCe11 activation of NR CA.docx], 43 pages.

International Search Report and Written Opinion mailed Feb. 13, 2024 for PCT Application No. PCT/US2023/035946, 14 pages.

International Search Report and Written Opinion mailed Feb. 26, 2024 for PCT Application No. PCT/US2023/035950, 19 pages.

International Search Report and Written Opinion mailed Mar. 1, 2024 for PCT Application No. PCT/US2023/036165, 19 pages.

Kumar et al. "Dynamic Additional Demodulation Reference Signal Configuration" U.S. Appl. No. 17/812,271, filed Jul. 13, 2022, 62 pages.

Kumar et al. "Dynamic Additional Demodulation Reference Signal Configuration" U.S. Appl. No. 17/812,265, filed Jul. 13, 2022, 62 pages.

Kumar et al. "Dynamic Additional Demodulation Reference Signal Configuration" U.S. Appl. No. 17/812,262, filed Jul. 13, 2022, 62 pages.

Kumar, Sunil. "Dynamic Additional Demodulation Reference Signal Configuration" U.S. Appl. No. 18/063,347, filed Dec. 8, 2022, 74 pages.

Kumar, Sunil. "Dynamic Additional Demodulation Reference Signal Configuration" U.S. Appl. No. 18/063,357, filed Dec. 8, 2022, 73 pages.

Kumar, Sunil. "Dynamic Additional Demodulation Reference Signal Configuration" U.S. Appl. No. 18/068,261, filed Dec. 19, 2022, 69 pages.

Kumar, Sunil. "Dynamic Additional Demodulation Reference Signal Configuration" U.S. Appl. No. 18/068,737, filed Dec. 20, 2022, 68 pages.

Office Action mailed Oct. 24, 2024 for U.S. Appl. No. 17/812,265, 46 pages.

Office Action mailed Nov. 19, 2024 for U.S. Appl. No. 17/812,262, 44 pages.

Office Action mailed Apr. 10, 2025 for U.S. Appl. No. 17/812,271, 35 pages.

Office Action mailed Mar. 24, 2025 for U.S. Appl. No. 18/063,347, 43 pages.

Office Action mailed Apr. 3, 2025 for U.S. Appl. No. 18/063,357, 66 pages.

Notice of Allowance mailed Feb. 26, 2025 for U.S. Appl. No. 17/812,262, 22 pages.

Notice of Allowance mailed May 5, 2025 for U.S. Appl. No. 18/068,737, 40 pages.

Notification concerning transmittal of International Preliminary Report on Patentability mailed Jun. 19, 2025 for PCT Application No. PCT/US2023/035945, 10 pages.

European Office Action mailed Jul. 15, 2025 for European Patent Application No. 23813121.3, 3 pages.

Notification concerning transmittal of International Preliminary Report on Patentability mailed Jun. 19, 2025 for PCT Application No. PCT/US2023/035946, 9 pages.

European Office Action mailed Jul. 15, 2025 for European Patent Application No. 2309824.8, 3 pages.

Office Action mailed Jul. 9, 2025 for U.S. Appl. No. 18/068,261, 47 pages.

Notification concerning transmittal of International Preliminary Report on Patentability mailed Jul. 3, 2025 for PCT Application No. PCT/US2023/035950, 14 pages.

Notification concerning transmittal of International Preliminary Report on Patentability mailed Jul. 3, 2025 for PCT Application No. PCT/US2023/036165, 14 pages.

European Office Action mailed Jul. 29, 2025 for European Patent Application No. 23813122.1, 3 pages.

European Office Action mailed Jul. 29, 2025 for European Patent Application No. 23813147.8, 3 pages.

Notice of Allowance mailed Jul. 29, 2025 for U.S. Appl. No. 18/063,347, 24 pages.

\* cited by examiner

100

```
-- ASN1START
-- TAG-DMRS-DOWNLINKCONFIG-START

DMRS-DownlinkConfig ::=         SEQUENCE {
    dmrs-Type                       ENUMERATED {type2}                      OPTIONAL,   -- Need S
    dmrs-AdditionalPosition         ENUMERATED {pos0, pos1, pos3}           OPTIONAL,   -- Need S
    maxLength                       ENUMERATED {len2}                       OPTIONAL,   -- Need S
    scramblingID0           102     INTEGER (0..65535)                      OPTIONAL,   -- Need S
    scramblingID1                   INTEGER (0..65535)                      OPTIONAL,   -- Need S
    phaseTrackingRS                 SetupRelease { PTRS-DownlinkConfig }    OPTIONAL,   -- Need M
    ...,
    [[
    dmrs-Downlink-r16               ENUMERATED {enabled}                    OPTIONAL    -- Need R
    ]]
}

-- TAG-DMRS-DOWNLINKCONFIG-STOP
-- ASN1STOP
```

```
-- ASN1START
-- TAG-DMRS-UPLINKCONFIG-START

DMRS-UplinkConfig ::=           SEQUENCE {
    dmrs-Type                       ENUMERATED {type2}                  OPTIONAL,   -- Need S
    dmrs-AdditionalPosition         ENUMERATED {pos0, pos1, pos3}       OPTIONAL,   -- Need S
    phaseTrackingRS                 SetupRelease { PTRS-UplinkConfig }  OPTIONAL,   -- Need M
    maxLength              202      ENUMERATED {len2}                   OPTIONAL,   -- Need S
    transformPrecodingDisabled      SEQUENCE {
        scramblingID0                   INTEGER (0..65535)              OPTIONAL,   -- Need S
        scramblingID1                   INTEGER (0..65535)              OPTIONAL,   -- Need S
        ...,
        [[
        dmrs-Uplink-r16                 ENUMERATED {enabled}            OPTIONAL    -- Need R
        ]]
    }                                                                   OPTIONAL,   -- Need R
}

-- TAG-DMRS-UPINKCONFIG-STOP
-- ASN1STOP
```

(arrow from 202 points to maxLength)

FACILITATING FIRST BROADBAND CELLULAR COMMUNICATIONS BETWEEN A USER EQUIPMENT AND CORE NETWORK EQUIPMENT THAT IS PART OF A CORE NETWORK ACCORDING TO A FIRST NUMBER OF ADDITIONAL DEMODULATION REFERENCE SIGNAL POSITIONS THAT ARE CONFIGURED IN RADIO RESOURCE CONTROL INFORMATION 1004

↓

DETERMINING TO MODIFY THE FIRST NUMBER OF ADDITIONAL DEMODULATION REFERENCE SIGNAL POSITIONS 1006

↓

BASED ON DETERMINING TO MODIFY THE FIRST NUMBER OF ADDITIONAL DEMODULATION REFERENCE SIGNAL POSITIONS, SENDING, TO THE USER EQUIPMENT, PHYSICAL DOWNLINK CONTROL CHANNEL DOWNLINK CONTROL INFORMATION THAT INDICATES A SECOND NUMBER OF ADDITIONAL DEMODULATION REFERENCE SIGNAL POSITIONS THAT ARE CONFIGURED IN THE DOWNLINK CONTROL INFORMATION 1008

↓

FACILITATING SECOND BROADBAND CELLULAR COMMUNICATIONS BETWEEN THE USER EQUIPMENT AND THE CORE NETWORK EQUIPMENT ACCORDING TO THE SECOND NUMBER OF ADDITIONAL DEMODULATION REFERENCE SIGNAL POSITIONS, WHEREIN A THROUGHPUT OF THE SECOND BROADBAND CELLULAR COMMUNICATIONS IS DETERMINED AS A FUNCTION OF A SIZE OF A TRANSPORT BLOCK SET BASED ON THE SECOND NUMBER OF ADDITIONAL DEMODULATION REFERENCE SIGNAL POSITIONS 1010

DETERMINING, BASED ON COMMUNICATING WITH A USER EQUIPMENT ACCORDING TO A FIRST NUMBER OF ADDITIONAL DEMODULATION REFERENCE SIGNAL POSITIONS THAT ARE CONFIGURED IN RADIO RESOURCE CONTROL DATA, TO MODIFY THE FIRST NUMBER OF ADDITIONAL DEMODULATION REFERENCE SIGNAL POSITIONS 1104

↓

BASED ON DETERMINING TO MODIFY THE FIRST NUMBER OF ADDITIONAL DEMODULATION REFERENCE SIGNAL POSITIONS, SENDING, TO THE USER EQUIPMENT, PHYSICAL DOWNLINK CONTROL CHANNEL DOWNLINK CONTROL DATA THAT INDICATES A SECOND NUMBER OF ADDITIONAL DEMODULATION REFERENCE SIGNAL POSITIONS THAT ARE CONFIGURED IN THE DOWNLINK CONTROL DATA 1106

↓

CONDUCTING BROADBAND CELLULAR COMMUNICATIONS WITH THE USER EQUIPMENT ACCORDING TO THE SECOND NUMBER OF ADDITIONAL DEMODULATION REFERENCE SIGNAL POSITIONS, WHEREIN A THROUGHPUT OF THE BROADBAND CELLULAR COMMUNICATIONS IS DETERMINED BASED ON A SIZE OF A TRANSPORT BLOCK THAT IS SET BASED ON THE SECOND NUMBER OF ADDITIONAL DEMODULATION REFERENCE SIGNAL POSITIONS 1108

DETERMINING, BASED ON COMMUNICATING WITH A USER EQUIPMENT ACCORDING TO A FIRST NUMBER OF ADDITIONAL DEMODULATION REFERENCE SIGNAL POSITIONS, TO MODIFY THE FIRST NUMBER OF ADDITIONAL DEMODULATION REFERENCE SIGNAL POSITIONS 1204

↓

BASED ON DETERMINING TO MODIFY THE FIRST NUMBER OF ADDITIONAL DEMODULATION REFERENCE SIGNAL POSITIONS, SENDING, TO THE USER EQUIPMENT, PHYSICAL DOWNLINK CONTROL CHANNEL DOWNLINK CONTROL INFORMATION THAT INDICATES A SECOND NUMBER OF ADDITIONAL DEMODULATION REFERENCE SIGNAL POSITIONS IN DOWNLINK CONTROL INFORMATION 1206

↓

ENABLING BROADBAND CELLULAR COMMUNICATIONS WITH THE USER EQUIPMENT ACCORDING TO THE SECOND NUMBER OF ADDITIONAL DEMODULATION REFERENCE SIGNAL POSITIONS 1208

DYNAMIC ADDITIONAL DEMODULATION REFERENCE SIGNAL CONFIGURATION

BACKGROUND

In cellular broadband communications, a user equipment and a core network can communicate to configure a protocol to use in making further communications.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can facilitate first broadband cellular communications between a user equipment and core network equipment that is part of a core network according to a first number of additional demodulation reference signal positions that are configured in radio resource control information. The system can determine to modify the first number of additional demodulation reference signal positions. The system can, based on determining to modify the first number of additional demodulation reference signal positions, send, to the user equipment, physical downlink control channel downlink control information that indicates a second number of additional demodulation reference signal positions that are configured in the downlink control information. The system can facilitate second broadband cellular communications between the user equipment and the core network equipment according to the second number of additional demodulation reference signal positions, wherein a throughput of the second broadband cellular communications is determined as a function of a size of a transport block set based on the second number of additional demodulation reference signal positions.

An example method can comprise determining, by a system comprising a processor, and based on communicating with a user equipment according to a first number of additional demodulation reference signal positions that are configured in radio resource control data, to modify the first number of additional demodulation reference signal position. The method can further comprise, based on determining to modify the first number of additional demodulation reference signal positions, sending, by the system to the user equipment, physical downlink control channel downlink control data that indicates a second number of additional demodulation reference signal positions that are configured in the downlink control data. The method can further comprise conducting, by the system, broadband cellular communications with the user equipment according to the second number of additional demodulation reference signal positions, wherein a throughput of the broadband cellular communications is determined based on a size of a transport block that is set based on the second number of additional demodulation reference signal positions.

An example non-transitory computer-readable medium can comprise instructions that, in response to execution, cause a system comprising a processor to perform operations. These operations can comprise determining, based on communicating with a user equipment according to a first number of additional demodulation reference signal positions, to modify the first number of additional demodulation reference signal positions. These operations can further comprise, based on determining to modify the first number of additional demodulation reference signal positions, sending, to the user equipment, physical downlink control channel downlink control information that indicates a second number of additional demodulation reference signal positions in downlink control information. These operations can further comprise enabling broadband cellular communications with the user equipment according to the second number of additional demodulation reference signal positions.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 1 illustrates an example demodulation reference signal (DMRS) downlink configuration information element that can facilitate dynamic additional DMRS configuration in accordance with an embodiment of this disclosure;

FIG. 2 illustrates an example DMRS uplink configuration information element that can facilitate dynamic additional DMRS configuration in accordance with an embodiment of this disclosure;

FIG. 10 illustrates an example process flow that can facilitate dynamic additional DMRS configuration, in accordance with an embodiment of this disclosure;

FIG. 11 illustrates another example process flow that can facilitate dynamic additional DMRS configuration, in accordance with an embodiment of this disclosure;

FIG. 12 illustrates another example process flow that can facilitate dynamic additional DMRS configuration, in accordance with an embodiment of this disclosure;

DETAILED DESCRIPTION

Figure 3A:
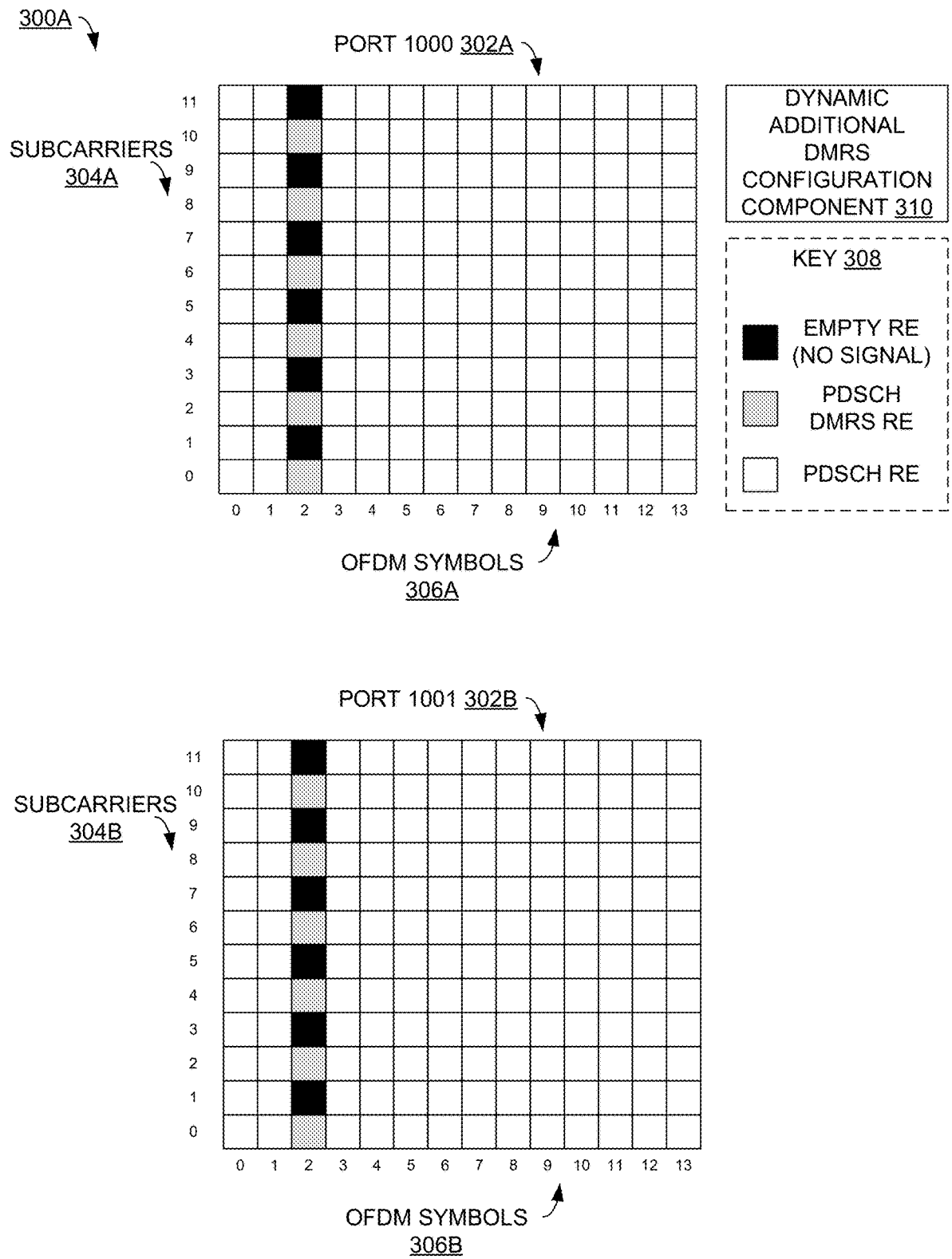
FIGS. 3A and 3B illustrate an example additional DMRS configuration that can facilitate dynamic additional DMRS configuration in accordance with an embodiment of this disclosure.

The examples herein generally relate to 5G cellular communications networks. It can be appreciated that the present techniques can be applied to other types of cellular communications networks for dynamically configuring additional demodulation reference signals (DMRSes).

A DMRS can be utilized by a 5G new radio (NR) receiver to produce channel estimates for demodulation of an associated physical channel A design and mapping of each DMRS can be specific to each 5G physical channel (e.g., physical broadcast channel (PBCH), physical downlink control channel (PDCCH), physical downlink shared channel (PDSCH), physical uplink control channel (PUSCH), and physical uplink shared channel (PUCCH)). DMRS can be user equipment (UE) specific, and be transmitted on demand In some examples, a DMRS does not extend outside of a scheduled physical resource of a channel it supports. DMRS can support massive multi-user multiple-input and multiple-output (MIMO). DMRS can be beamformed and, in some examples, support up to 12 orthogonal layers. A DMRS sequence for a cyclic-prefix orthogonal frequency division multiplexing (CP-OFDM) version can be quadrature phase shift keying (QPSK) based on Gold Sequences.

With respect to PDSCH, DMRS can comprise front-loaded DMRS symbols (e.g., either 1 or 2) that are located as follows:
1. Slot based (DMRS mapping type-A): This can be a fixed orthogonal frequency division multiplexing (OFDM) symbol regardless of PDSCH assignment and that is configurable between lo={2,3}.
2. Non-slot based (DMRS mapping type-B): This can be a first OFDM symbol assigned for PDSCH—e.g., mini slots.

In some examples, additional DMRS symbols can be configured in scenarios such as high-speed mobility (e.g., handover); when downlink (DL)/uplink (UL) block error ratio (BLER) is high, and UE-reported channel condition is poor; and when a UE is located on a cell edge, and, because of that, the UE is not able to decode or send DL and UL packets.

With regard to PUSCH DMRS, in an uplink, it can be that two waveform types are supported (e.g., CP-OFDM, and discrete Fourier transform-spread orthogonal frequency division multiplexing (DFT-S-OFDM)). A gold sequence can be used in CP-OFDM, and a Zadoff-Chu sequence can be used in DFT-S-OFDM. Front loaded DMRS symbols (e.g., either 1 or 2) can be located at a first OFDM symbol that is assigned for PUSCH.

The present techniques can be implemented to solve the following problems.

One problem that can be solved by implementing the present techniques can be when a 5G base station (sometimes referred to as gNodeB or gNB; or more generally a base station) includes an dmrs-AdditionalPosition information element (IE) using DMRS-DownlinkConfig and DMRS-UplinkConfig for downlink and uplink, respectively, during UE attach or another UE-specific procedure, then that configuration can stay with the UE during the lifetime of the scenario unless it is modified by a radio resource control (RRC) modification procedure.

A dmrs-AdditionalPosition IE for DL and UL is indicated in FIGS. 1 and 2, respectively. That is, FIG. 1 illustrates an example DMRS downlink configuration information element 100 that can facilitate dynamic additional DMRS configuration in accordance with an embodiment of this disclosure. In example DMRS downlink configuration information element 100, there is dmrs-AdditionalPosition 102.

And FIG. 2 illustrates an example DMRS uplink configuration information element 200 that can facilitate dynamic additional DMRS configuration in accordance with an embodiment of this disclosure. In example DMRS uplink configuration information element 200, there is dmrs-AdditionalPosition 202.

Once this configuration is received by the UE, then the gNB and the UE can consider that configuration while determining a transport block (TB; which can generally determine data throughput of the UE). A TB can vary based on a number of additional DMRS positions that are configured.

Data throughput (TP) can be inversely proportional to a number of configured additional DMRS positions—that is, where more additional DMRS symbols are configured then there can be less data throughput.

Figure 3B:
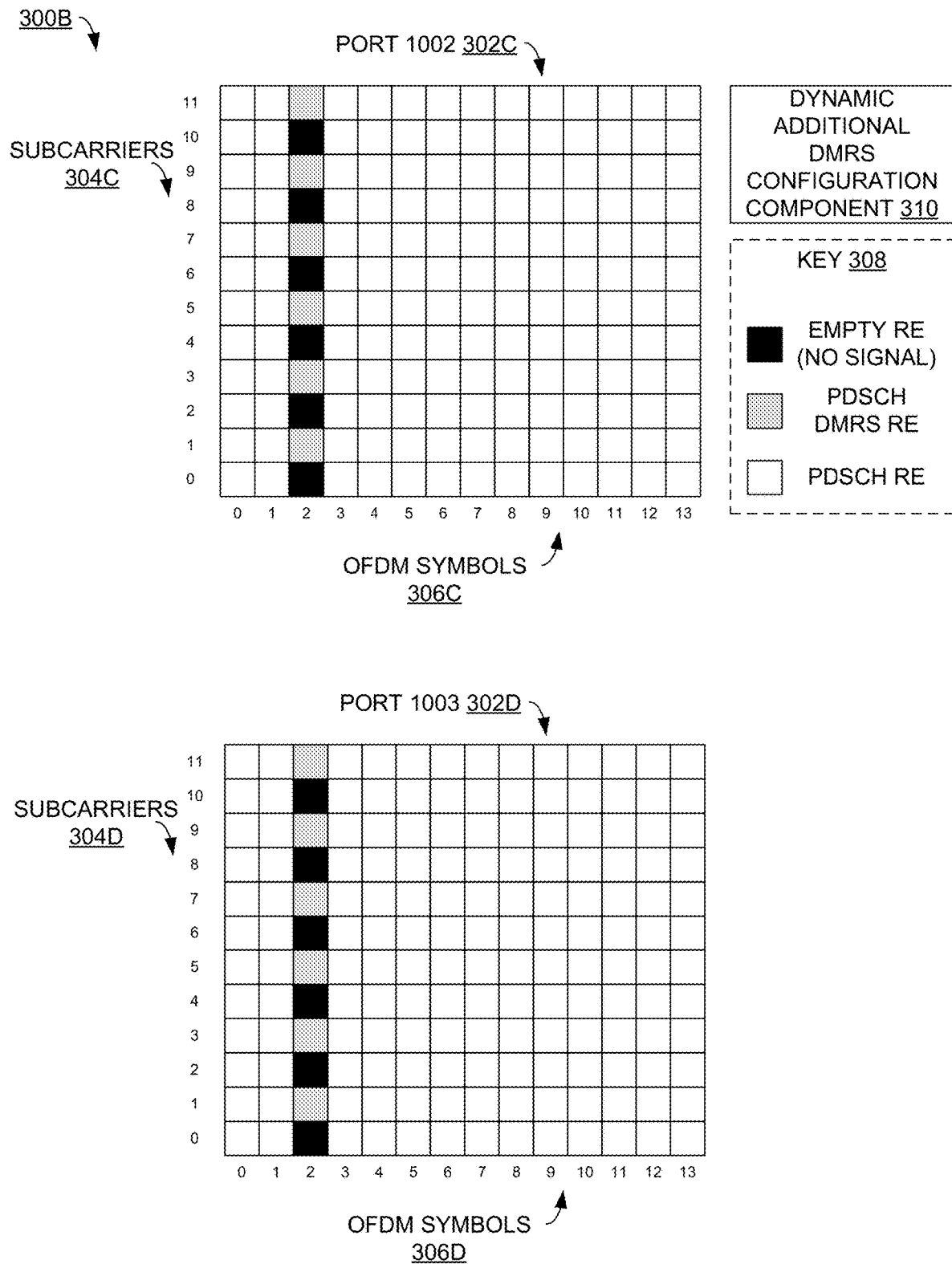

FIGS. 3A and 3B illustrate an example additional DMRS configuration 300A and 300B that can facilitate dynamic additional DMRS configuration in accordance with an embodiment of this disclosure. Example additional DMRS configuration 300A and 300B (as well as example additional DMRS configuration 400A and 400B of FIGS. 4A and 4B; example additional DMRS configuration 500A and 500B of FIGS. 5A and 5B; and example additional DMRS configuration 600A and 600B of FIGS. 6A and 6B) can have the following settings:
  pdsch.NumLayers=4;
  pdsch.MappingType='A';
  pdsch.SymbolAllocation=[0 13]; % [startSymbol Length]
  dmrs.DMRSconfigurationType=1;
  dmrs.DMRSLength=1;
  dmrs.DMRSTypeAPosition=2;
  dmrs.NumCDMGroupsWithoutData=2;
  dmrs.NIDNSCID=10;
  dmrs.NSCID=0;

Additionally, example additional DMRS configuration 300A and 300B has "dmrs.DMRSAdditionalPosition=0;" which indicates that there are no additional DMRS positions configured. This configuration is illustrated in additional DMRS configuration 300A and 300B, which comprises port 1000 302A (with subcarriers 304A and OFDM symbols 306A); port 1001 302B (with subcarriers 304B and OFDM symbols 306B); port 1002 302C (with subcarriers 304C and OFDM symbols 306C); and port 1003 302D (with subcarriers 304D and OFDM symbols 306D).

Example additional DMRS configuration 300A and 300B also comprises dynamic additional DMRS configuration component 310 (which can comprise a computer component that implements the present techniques) and key 308. As depicted, FIGS. 3A and 3B relate to a 4-port antenna configuration, and dynamic additional DMRS configuration component 310 can comprise a 4-port dynamic additional DMRS configuration component.

Figure 4A:
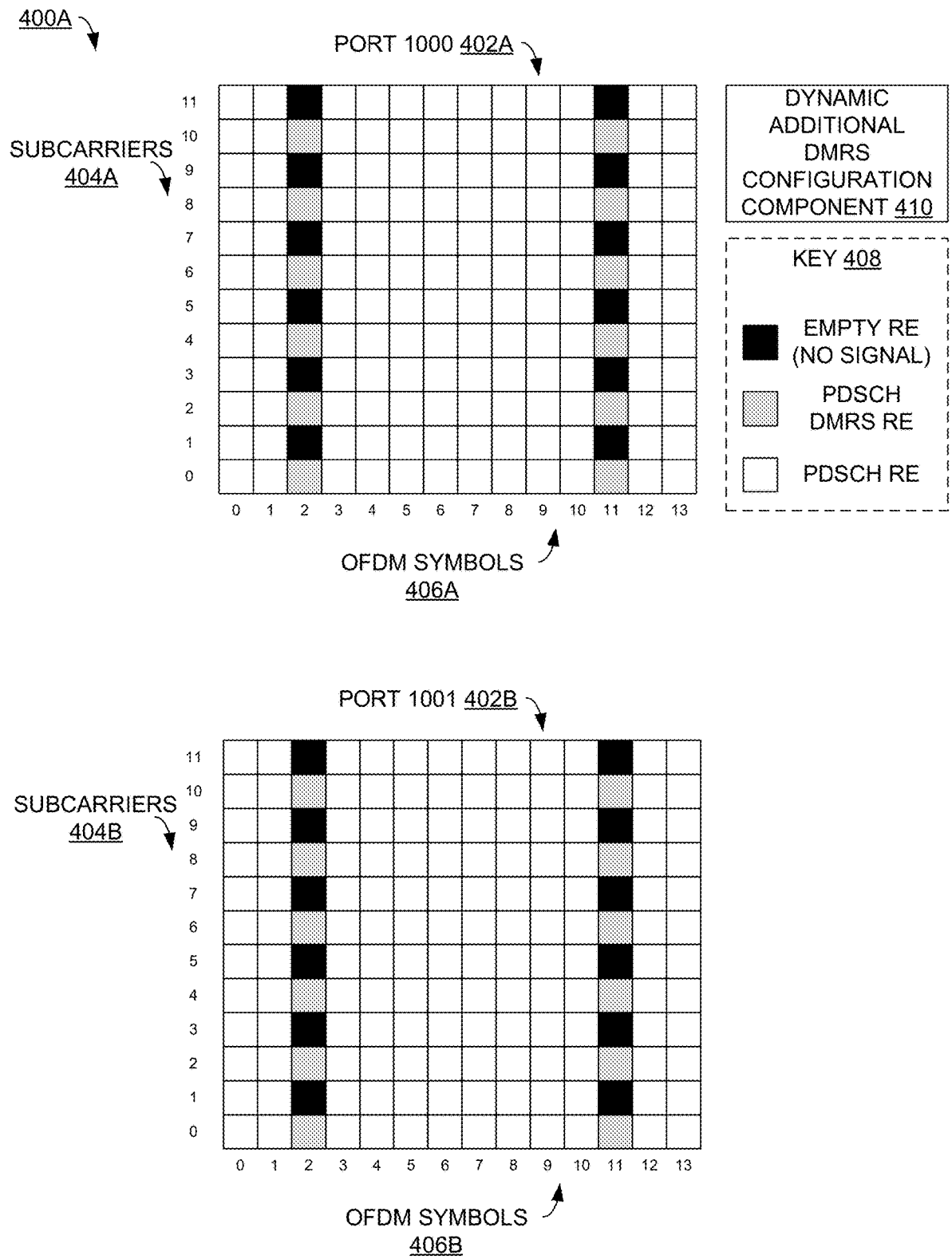
FIGS. 4A and 4B illustrate another example additional DMRS configuration that can facilitate dynamic additional DMRS configuration in accordance with an embodiment of this disclosure.
Figure 4B:
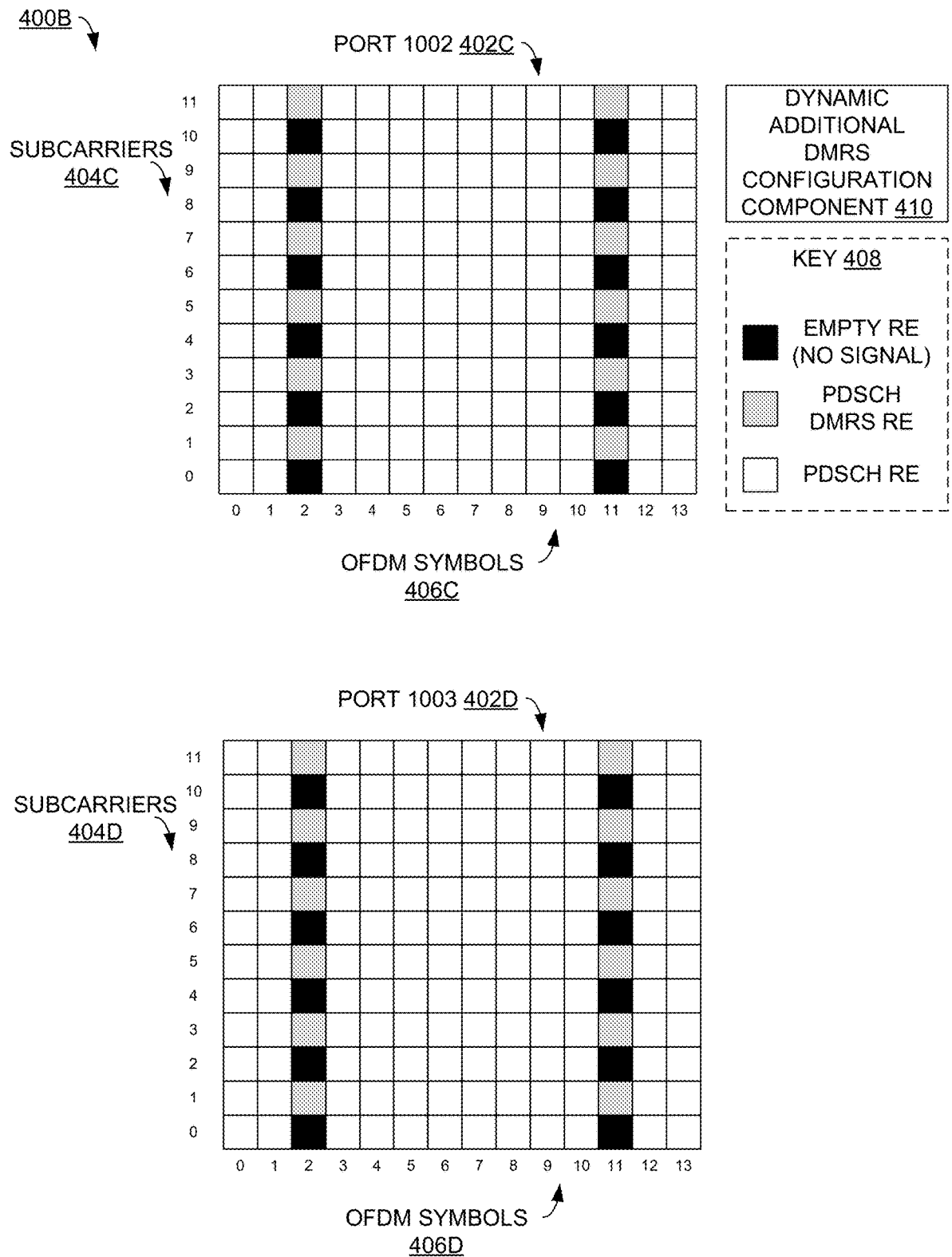

FIGS. 4A and 4B illustrate another example additional DMRS configuration 400A and 400B that can facilitate dynamic additional DMRS configuration in accordance with an embodiment of this disclosure.

Example additional DMRS configuration 400A and 400B has "dmrs.DMRSAdditionalPosition=1;" which indicates that there is one additional DMRS position configured. This configuration is illustrated in additional DMRS configuration 400A and 400B, which comprises port 1000 402A (with subcarriers 404A and OFDM symbols 406A); port 1001 402B (with subcarriers 404B and OFDM symbols 406B); port 1002 402C (with subcarriers 404C and OFDM symbols 406C); and port 1003 402D (with subcarriers 404D and OFDM symbols 406D).

Example additional DMRS configuration 400A and 400B also comprises dynamic additional DMRS configuration component 410 (which can comprise a computer component that implements the present techniques) and key 408.

Figure 5A:
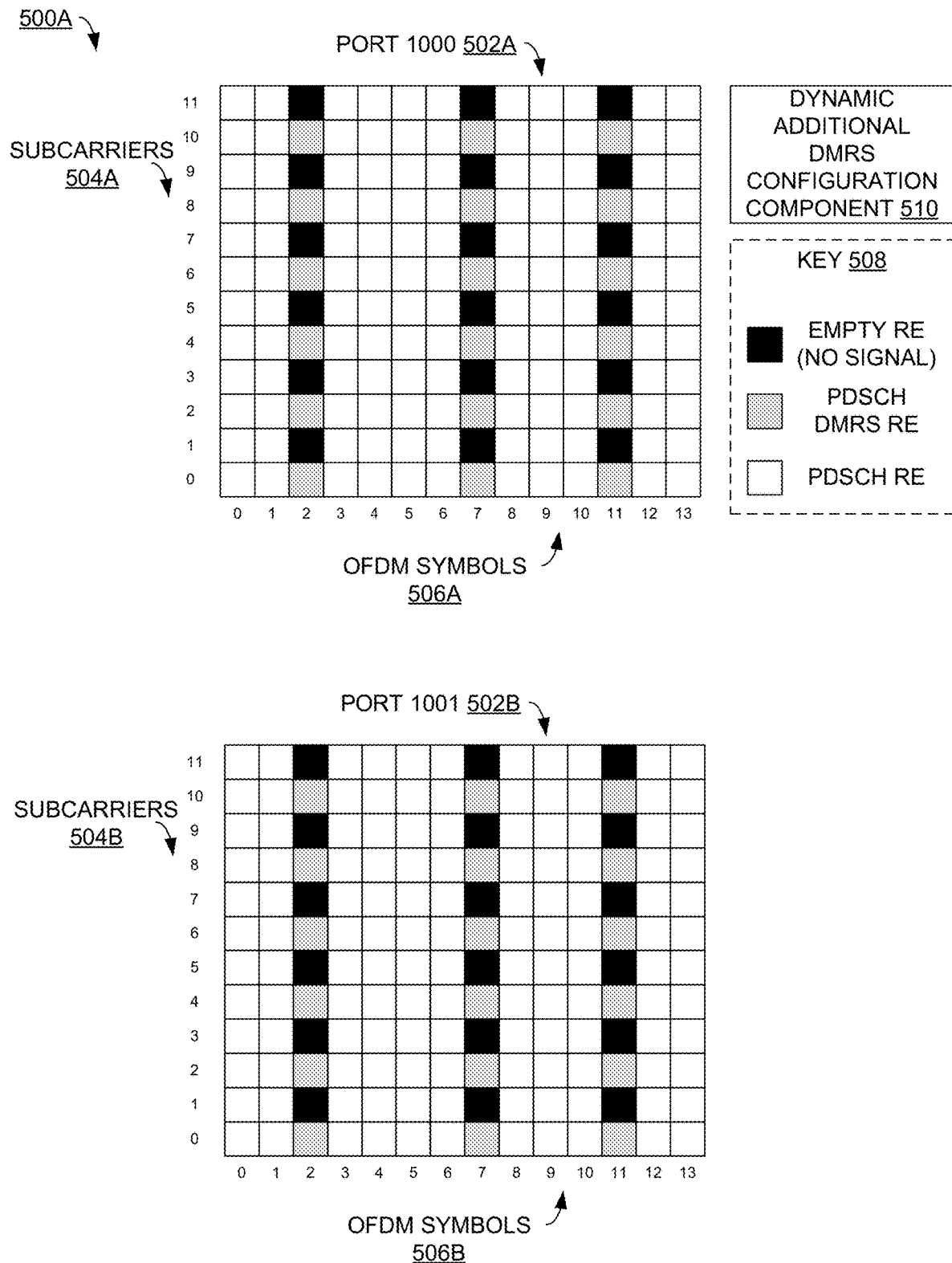
FIGS. 5A and 5B illustrate another example additional DMRS configuration that can facilitate dynamic additional DMRS configuration in accordance with an embodiment of this disclosure.
Figure 5B:
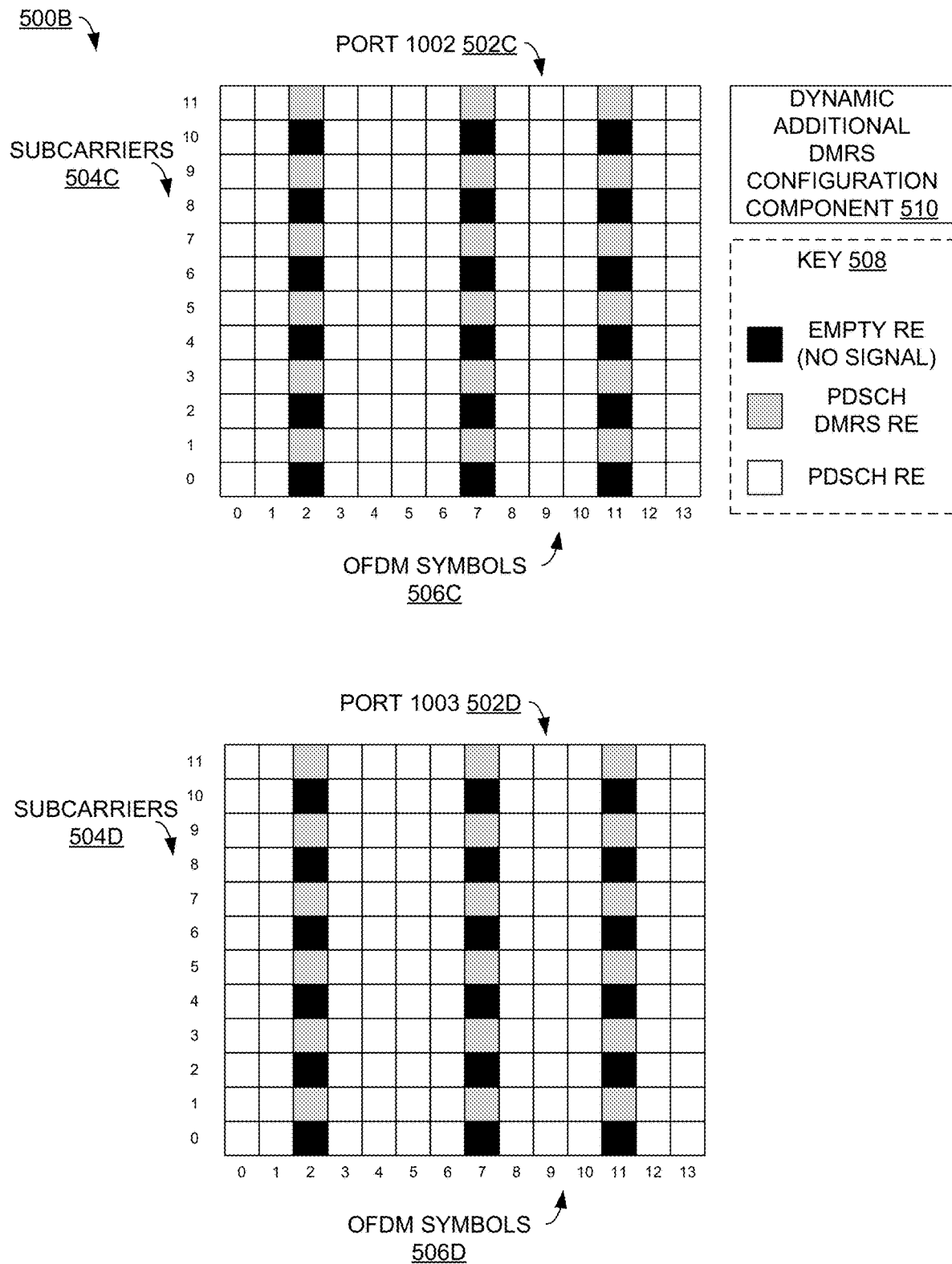

FIGS. 5A and 5B illustrate another example additional DMRS configuration 500A and 500B that can facilitate dynamic additional DMRS configuration in accordance with an embodiment of this disclosure.

Example additional DMRS configuration 500A and 500B has "dmrs.DMRSAdditionalPosition=2;" which indicates that there are two additional DMRS positions configured. This configuration is illustrated in additional DMRS configuration 500A and 500B, which comprises port 1000 502A (with subcarriers 504A and OFDM symbols 506A); port 1001 502B (with subcarriers 504B and OFDM symbols 506B); port 1002 502C (with subcarriers 504C and OFDM symbols 506C); and port 1003 502D (with subcarriers 504D and OFDM symbols 506D).

Example additional DMRS configuration 500A and 500B also comprises dynamic additional DMRS configuration component 510 (which can comprise a computer component that implements the present techniques) and key 508.

Figure 6A:
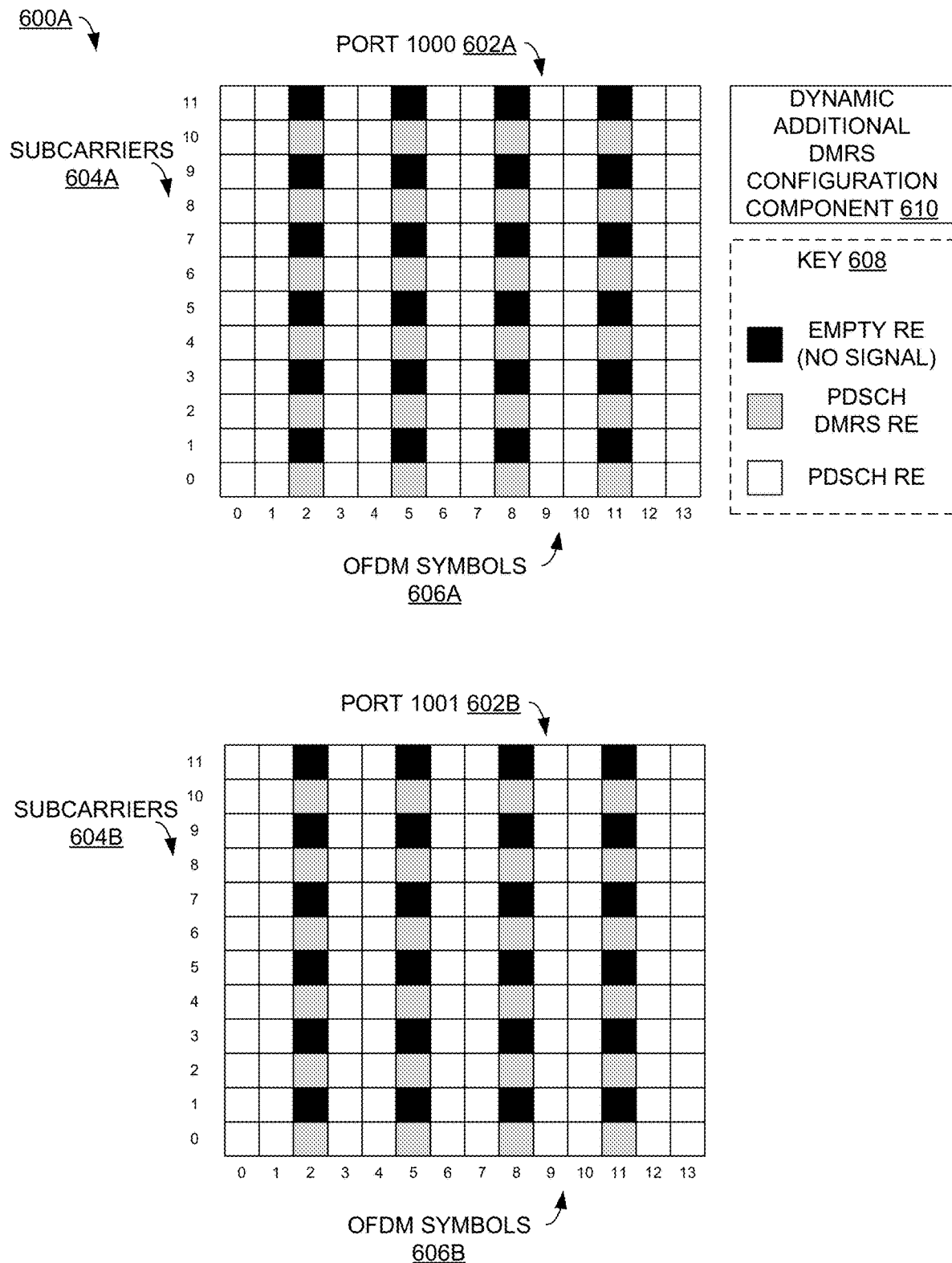
FIGS. 6A and 6B illustrate another example additional DMRS configuration that can facilitate dynamic additional DMRS configuration in accordance with an embodiment of this disclosure.
Figure 6B:
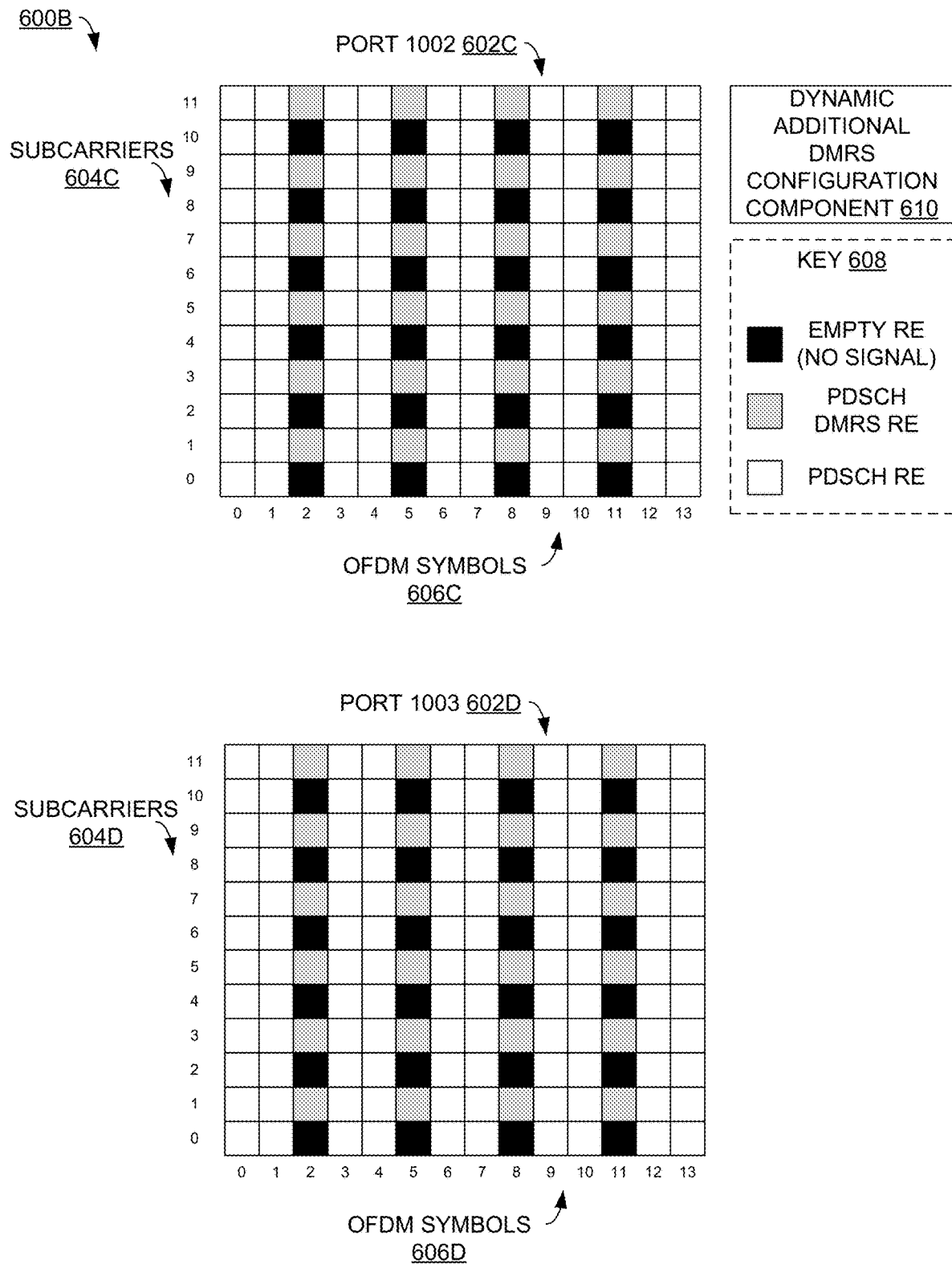

FIGS. 6A and 6B illustrate another example additional DMRS configuration 600A and 600B that can facilitate dynamic additional DMRS configuration in accordance with an embodiment of this disclosure.

Example additional DMRS configuration 600A and 600B has "dmrs.DMRSAdditionalPosition=3;" which indicates that there are three additional DMRS positions configured. This configuration is illustrated in additional DMRS configuration 600A and 600B, which comprises port 1000 602A (with subcarriers 604A and OFDM symbols 606A); port 1001 602B (with subcarriers 604B and OFDM symbols 606B); port 1002 602C (with subcarriers 604C and OFDM symbols 606C); and port 1003 602D (with subcarriers 604D and OFDM symbols 606D).

Example additional DMRS configuration 600A and 600B also comprises dynamic additional DMRS configuration component 610 (which can comprise a computer component that implements the present techniques) and key 608.

In the example of FIGS. 3A and 3B, there is no additional DMRS configured. In the example of FIGS. 4A and 4B, there is one additional DMRS symbol configured. In the example of FIGS. 5A and 5B, there are two additional DMRS symbols configured. In the example of FIGS. 6A and 6B, there are three additional DMRS symbols configured. So, in these examples, data throughput in FIGS. 3A and 3B can be greater than in FIGS. 4A and 4B, which can be greater than in FIGS. 5A and 5B, which can be greater than in FIGS. 6A and 6B.

As part of dynamically configuring additional DMRS positions, a component (e.g., dynamic additional DMRS configuration component 310 of FIGS. 3A and 3B) can dynamically switch between the configurations of FIGS. 4A and 4B, 5A and 5B, and 6A and 6B One problem with additional DMRS configuration can be physical resource block (PRB) wastage because of an unnecessarily-configured higher additional DMRS position. Implementing the present techniques to dynamically change the additional DMRS position can be implemented to solve this problem.

Take an example where, during UE attach, a gNB configured an additional DMRS configuration in pos3 (indicating 3 additional DMRS symbols). Where radio/channel condition is good, where the UE is reporting a channel quality indicator (CQI), and UL and DL data BLER % are under 1% (indicating that a PDSCH and PUSCH packet decoding success rate is high), then having 3 symbols for additional DMRS can negatively impact data throughput.

Some prior approaches do not allow changing this configuration dynamically, and because of that, the gNB can be unnecessarily wasting a physical resource block.

Another problem with additional DMRS configuration can relate to frequent UE release, or a UE performing a RRC reestablishment procedure because channel condition is poor. Implementing the present techniques to dynamically change the additional DMRS position can be implemented to solve this problem.

Take an example where, during UE attach, the gNB has not configured an additional DMRS configuration in DL and or UL. Where radio/channel condition is poor, where the UE is reporting CQI and UL and DL BLER % is high (e.g., >20%, which can indicate that a success rate of decoding PDSCH and PUSCH packets is poor), it can be that the UE or gNB can perform a UE release or RRC reestablishment procedure. This procedure can take a long time to restore the connection. This problem can be avoided by dynamically configuring additional DMRS positions to sustain the connection. In some prior approaches, this configuration cannot be dynamically altered.

Another problem with additional DMRS configuration can relate to a high-speed mobility (handover) scenario. In a high-speed handover scenario, channel/radio condition can be kept on very frequently, to sustain and maintain good quality for a call. Additional DMRS symbols can be adapted dynamically based on reported CQI and BLER, to achieve good throughput, while also not compromising by wasting physical resources.

Another problem with additional DMRS configuration can relate to a scenario where a UE is located at a cell edge. It can be that, when a UE is located at a cell edge, the UE's channel quality is subpar, BLER % can be high. To improve this condition, a gNB can quickly adapt an additional DMRS configuration. It can be that adapting a DMRS configuration based on link adaptation is not supported by prior approaches.

The present techniques for dynamic additional DMRS configuration can be implemented as follows.

In some examples, a new field (e.g., "additional DMRS indicator") can be implemented for downlink and uplink DL in downlink control information (DCI). A field for downlink can be added in DCI format 1_1. A field for uplink can be added in DCI format 0_1.

In some examples, an IE in UE capability for downlink and uplink can be implemented to support dynamic additional DMRS configuration. An IE ("dynamicAdditionalDMRS Support") for downlink can be implemented in FeatureSetDownlink. Where a UE supports this IE, it can mean that the UE supports dynamic additional DMRS configuration change in the downlink direction.

An IE ("dynamicAdditionalDMRSSupport") for uplink can be implemented in FeatureSetUplink. Where a UE supports this IE, it can mean that the UE supports dynamic additional DMRS configuration change in the uplink direction.

In some examples, an IE ("dynamicAdditionalDmrsSupport") can be implemented in PDSCH-Config for downlink, and in PUSCH-Config for uplink.

Figure 7:
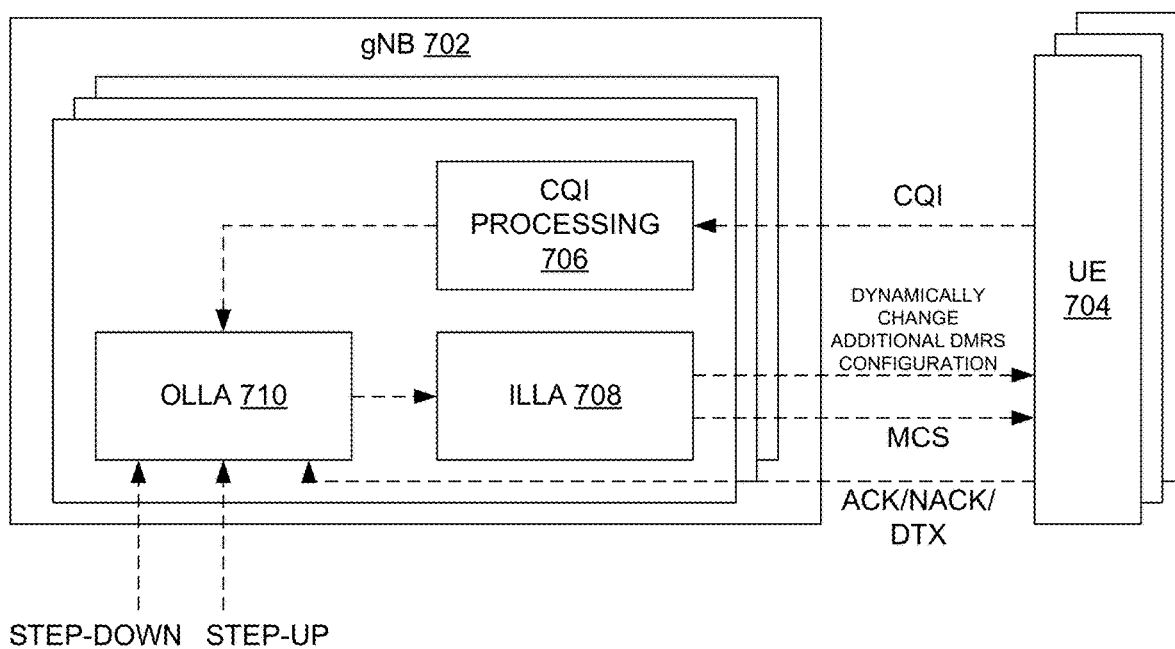
FIG. 7 illustrates an example system architecture that can facilitate dynamic additional DMRS configuration in accordance with an embodiment of this disclosure.

FIG. 7 illustrates an example system architecture 700 that can facilitate dynamic additional DMRS configuration in accordance with an embodiment of this disclosure. System architecture comprises gNB 702, UE 704, CQI processing 706, inner loop link adaptation (ILLA) 708, and gNB outer loop link adaptation (OLLA) 710 (which, in some examples, can more generally be a base station outer loop link adaptation).

In some examples, gNB 702 can determine additional DMRS information dynamically, as follows. As depicted in FIG. 7, where UE 704 is reporting channel quality using CQI, and hybrid automatic repeat request (HARQ) feedback (e.g., acknowledgment (ACK), negative acknowledgment (NACK), and discontinuous transmission (DTX)) for data transmission then, OLLA 710 can handle the HARQ feedback, and CQI processing 706 can handle CQI reported by UE 704.

Based on these two inputs, ILLA 708 can determine a modulation coding scheme (MCS) and additional DMRS position to be applied to UL and DL data transmission.

ILLA 708 can determine the MCS by considering the CQI reported by UE 704, and HARQ feedback. In some examples, the higher the MCS, the better the channel/radio quality, meaning a smaller number of additional DMRS positions configured to UE 704 using the present techniques.

Where ILLA 708 determines to use a lower MCS, meaning the channel quality reported by UE 704 is not good and BLER is high, this can mean that ILLA 708 determines to increase the additional DMRS position in DL/UL DCI to decrease the BLER %.

The following can be communicated as part of conveying capability of a UE. A FeatureSetCombination information element can be as follows:

```
-- ASN1START
-- TAG-FEATURESETCOMBINATION-START
FeatureSetCombination ::=          SEQUENCE (SIZE
    (1..maxSimultaneousBands)) OF FeatureSetsPerBand
FeatureSetsPerBand ::=             SEQUENCE (SIZE
    (1..maxFeatureSetsPerBand)) OF FeatureSet
FeatureSet ::=                     CHOICE {
    eutra                          SEQUENCE {
        downlinkSetEUTRA           FeatureSetEUTRA-
DownlinkId,
        uplinkSetEUTRA             FeatureSetEUTRA-
UplinkId
    },
    nr                             SEQUENCE {
        downlinkSetNR
FeatureSetDownlinkId,
        uplinkSetNR                FeatureSetUplinkId
    }
}
-- TAG-FEATURESETCOMBINATION-STOP
-- ASN1STOP
```

An IE, FeatureSetDownlink, can indicate a set of features that a UE supports on carriers corresponding to one band entry in a band combination. A FeatureSetDownlink IE can be as follows:

```
-- ASN1START
-- TAG-FEATURESETDOWNLINK-START
FeatureSetDownlink ::=             SEQUENCE {
    featureSetListPerDownlinkCC    SEQUENCE (SIZE
    (1..maxNrofServingCells)) OF FeatureSetDownlinkPerCC-Id,
        intraBandFreqSeparationDL
FreqSeparationClass
OPTIONAL,
        scalingFactor              ENUMERATED
    {f0p4, f0p75, f0p8}
OPTIONAL,
        crossCarrierScheduling-OtherSCS  ENUMERATED
    {supported}
OPTIONAL,
        scellWithoutSSB            ENUMERATED
    {supported}
OPTIONAL,
        csi-RS-MeasSCellWithoutSSB  ENUMERATED
    {supported}
OPTIONAL,
        ...........
            -- An IE to indicate UE capability to support downlink
dynamic additional DMRS feature.
        dynamicAdditionalDMRSSupport   ENUMERATED
    {supported}
OPTIONAL,
        ...........
        dummy1                     ENUMERATED
    {supported}
OPTIONAL,
        dummy6                     SEQUENCE (SIZE
    (1.. maxNrofCodebooks)) OF DummyD
OPTIONAL,
        dummy7                     SEQUENCE (SIZE
    (1.. maxNrofCodebooks)) OF DummyE
OPTIONAL
}
-- TAG-FEATURESETDOWNLINK-STOP
-- ASN1STOP
```

In a FeatureSetDownlink IE, a UE can set a dynamicAdditionalDMRSSupport field to support where the UE is capable of supporting downlink additional DMRS features.

An IE, FeatureSetUplink, can indicate a set of features that a UE supports on carriers corresponding to one band entry in a band combination. A FeatureSetUplink IE can be as follows:

```
-- ASN1START
-- TAG-FEATURESETUPLINK-START
FeatureSetUplink ::=               SEQUENCE {
    featureSetListPerUplinkCC      SEQUENCE (SIZE (1..
maxNrofServingCells)) OF FeatureSetUplinkPerCC-Id,
        scalingFactor              ENUMERATED {f0p4,
f0p75, f0p8}
OPTIONAL,
        crossCarrierScheduling-OtherSCS  ENUMERATED
    {supported}
OPTIONAL,
        intraBandFreqSeparationUL  FreqSeparationClass
OPTIONAL,
        searchSpaceSharingCA-UL    ENUMERATED
    {supported}
OPTIONAL,
        ...........
            -- An IE to indicate UE capability to support Uplink
dynamic additional DMRS feature.
        dynamicAdditionalDMRSSupport   ENUMERATED
    {supported}
OPTIONAL,
        ...........
        dummy1                     DummyI
OPTIONAL,
        supportedSRS-Resources     SRS-Resources
OPTIONAL,
        twoPUCCH-Group             ENUMERATED
    {supported}
OPTIONAL,
        dynamicSwitchSUL           ENUMERATED
    {supported}
OPTIONAL,
        simultaneousTxSUL-NonSUL   ENUMERATED
    {supported}
OPTIONAL,
        pusch-ProcessingType1-DifferentTB-PerSlot SEQUENCE {
            scs-15kHz              ENUMERATED
    {upto2, upto4, upto7}
OPTIONAL,
            scs-30kHz              ENUMERATED
    {upto2, upto4, upto7}
OPTIONAL,
            scs-60kHz              ENUMERATED
    {upto2, upto4, upto7}
OPTIONAL,
            scs-120kHz             ENUMERATED
    {upto2, upto4, upto7}
OPTIONAL
        }
OPTIONAL,
        dummy2                     DummyF
OPTIONAL
}
-- TAG-FEATURESETUPLINK-STOP
-- ASN1STOP
```

In a FeatureSetUplink IE, a UE can set a dynamicAdditionalDMRSSupport field to support where the UE is capable of supporting uplink additional DMRS features.

A PDSCH-Config IE that is used to configure a UE's specific PDSCH parameters can be as follows:

```
-- ASN1START
-- TAG-PDSCH-CONFIG-START
PDSCH-Config ::=                              SEQUENCE {
      dataScramblingIdentityPDSCH             INTEGER
   (0..1023)
OPTIONAL,   -- Need S
      dmrs-DownlinkForPDSCH-MappingTypeA      SetupRelease {
DMRS-DownlinkConfig }
OPTIONAL,   -- Need M
      dmrs-DownlinkForPDSCH-MappingTypeB      SetupRelease {
DMRS-DownlinkConfig }
OPTIONAL,   -- Need M
         ................
         ................
         -- An IE to support dynamic additional DMRS position
change.
      dynamicAdditionalDmrsSupport            ENUMERATED
{enabled}                                     OPTIONAL,   -- Need S
         ................
         ................
      tci-StatesToAddModList                  SEQUENCE
   (SIZE(1..maxNrofTCI-States)) OF TCI-State
OPTIONAL,   -- Need N
      pdsch-TimeDomainAllocationList-r16      SetupRelease {
PDSCH-TimeDomainResourceAllocationList-r16 }
OPTIONAL,   -- Need M
      repetitionSchemeConfig-r16              SetupRelease {
RepetitionSchemeConfig-r16}                   OPTIONAL
-- Need M
      ]]
}
-- TAG-PDSCH-CONFIG-STOP
-- ASN1STOP
```

In a PDSCH-Config, where a dynamicAdditionalDmrs-Support IE is configured to indicate that an additional DMRS feature is enabled, then a gNB can include "additional DMRS indicator" in downlink DCI format 1_1. In some examples, it can be that, otherwise, this feature is not supported if this field is absent.

An IE, PUSCH-Config, that can be used to configure UE specific PUSCH parameters applicable to a particular bandwidth part (BWP) can be as follows:

In a PUSCH-Config, where a dynamicAdditionalDmrs-Support IE is configured to indicate that an additional DMRS feature is enabled, then a gNB can include "additional DMRS indicator" in uplink DCI format 0_1. In some examples, it can be that, otherwise, this feature is not supported if this field is absent.

In some examples, DL DCI format 1_1 can include the following field relating to additional DMRS symbol configuration:

```
-- ASN1START
-- TAG-PUSCH-CONFIG-START
PUSCH-Config ::=                              SEQUENCE {
      dataScramblingIdentityPUSCH             INTEGER
   (0..1023)
OPTIONAL,   -- Need S
      txConfig                                ENUMERATED
   {codebook, nonCodebook}
OPTIONAL,   -- Need S
      dmrs-UplinkForPUSCH-MappingTypeA        SetupRelease {
DMRS-UplinkConfig }
OPTIONAL,   -- Need M
      dmrs-UplinkForPUSCH-MappingTypeB        SetupRelease {
DMRS-UplinkConfig }
OPTIONAL,   -- Need M
         ................
         ................
         -- Newly proposed IE to support dynamic additional
DMRS position change.
      dynamicAdditionalDmrsSupport            ENUMERATED
{enabled}                                     OPTIONAL,   -- Need S
         ................
         ................
}
-- TAG-PDSCH-CONFIG-STOP
   -- ASN1STOP
```

| Field (Item) | Bits | Description |
|---|---|---|
| Additional DMRS Indicator | 2 | Additional DMRS Symbol configuration<br>0 - If no Additional DMRS symbol configured.<br>1 - One additional DMRS symbol configured.<br>2 - two additional DMRS symbols configured.<br>3 - Three additional DMRS symbols configured. |

In some examples, UL DCI format 0_1 can include the following field relating to additional DMRS symbol configuration:

| Field (Item) | Bits | Description |
|---|---|---|
| Additional DMRS Indicator | 2 | Additional DMRS Symbol configuration<br>0 - If no Additional DMRS symbol configured.<br>1 - One additional DMRS symbol configured.<br>2 - two additional DMRS symbols configured.<br>3 - Three additional DMRS symbols configured. |

FIG. 8 illustrates an example signal flow 800 for dynamic additional DMRS configuration for a downlink, and that can facilitate dynamic additional DMRS configuration in accordance with an embodiment of this disclosure. As depicted, in signal flow 800, communications are sent between user equipment 802, gNB 804, and 5G core (5GC) 806 (which comprises access and mobility management function (AMF) 808 and user plane function (UPF) 810).

The signal flow of signal flow 800 is an example signal flow, and there can be signal flows that implement different signals, or the signals of signal flow 800 in a different order, as part of facilitating dynamic additional DMRS configuration.

As depicted in signal flow 800, the following occurs:
5G-NR RRC connection setup 812
Msg1:Preamble 814
Allocate temporary Cell Radio Network Temporary Identifier (C-RNTI) 816
PDCCH DCI Format 1_0 [Random Access RNTI (RA_RNTI)] 818
Msg2:Random Access Response 820
Msg3:RRCSetupRequest 822
PDCCH DCI Format 1_0 [C_RNTI] 824
Msg4:RRCSetup 826, where a dynamicAdditionalDmrs-Support[TRUE/FALSE] IE is contained in this message, and can be added as part of the present techniques
PDCCH DCI Format 0_0 [C_RNTI] 828
RRCSetupComplete 830
AMF Selection 832
Initial UE message [Non-Access-Stratum-Protocol Data Unit (NAS-PDU):Registration Request] 834
NAS Identity Request/Response 836
NAS Authentication Request/Response 838
NAS Security Mode Command/Complete 840
UE capability enquiry 841A
UE capability information, with dynamicAdditionalDmrsSupport[Supported] IE in FeatureSetDownlink 841B
Initial Context Setup Request [NAS-PDU:Registration Accept] 842
RRCReconfiguration with dynamicAdditional Dmrs Support=TRUE in PDSCH-Config IE where UE supports this feature in downlink 844 (which can indicate that the UE already supports a dynamic additional DMRS feature that is communicated by the UE in 841B as part of UE capability information; here, a gNB can add this IE in a RRC Reconfiguration message)
RRCReconfigurationComplete 846
Initial Context Setup Response 848
Standalone (SA) UE attach procedure completed 850
Start downlink data transfer and channel quality reporting 852
Downlink data 854
Downlink data 856
PDCCH DCI Format 1_1 [C_RNTI] 858
Downlink Data [Medium Access Control (MAC) PDU contains PDSCH] 860
HARQ Feedback=ACK 862
Channel State Information (CSI) Report [CQI=15] 864
DL data decoding failed at UE 866
CSI Report [CQI=9, 7, 6, . . . ] 868
Channel condition gets worse 870
CSI Report [CQI=4, 5, 1, . . . ] 572
PDCCH DCI Format 1_1 [C_RNTI] 874
Downlink Data [MAC PDU contains PDSCH] 876
HARQ Feedback=NACK 878
HARQ Feedback=DTX 880
Trigger/change additional DMRS configuration in DL DCI because condition met 882, where, in some examples, a condition can be CQI reporting is bad for a certain threshold and period; HARQ feedback is reported as NACK (e.g., BLER is high for a certain threshold and period); UE is on a cell edge; and/or UE is on high mobility
Downlink Data 884
PDCCH DCI Format 1_1 [with additional DMRS indicator field] 886, where the additional DMRS indicator field can be implemented as part of the present techniques
Downlink Data [MAC PDU contains PDSCH] 888
HARQ Feedback=ACK 890
Downlink Data 892
Improvement seen in UE throughput for DL Data 894
DL Data transfer continues 896

Figure 9A:
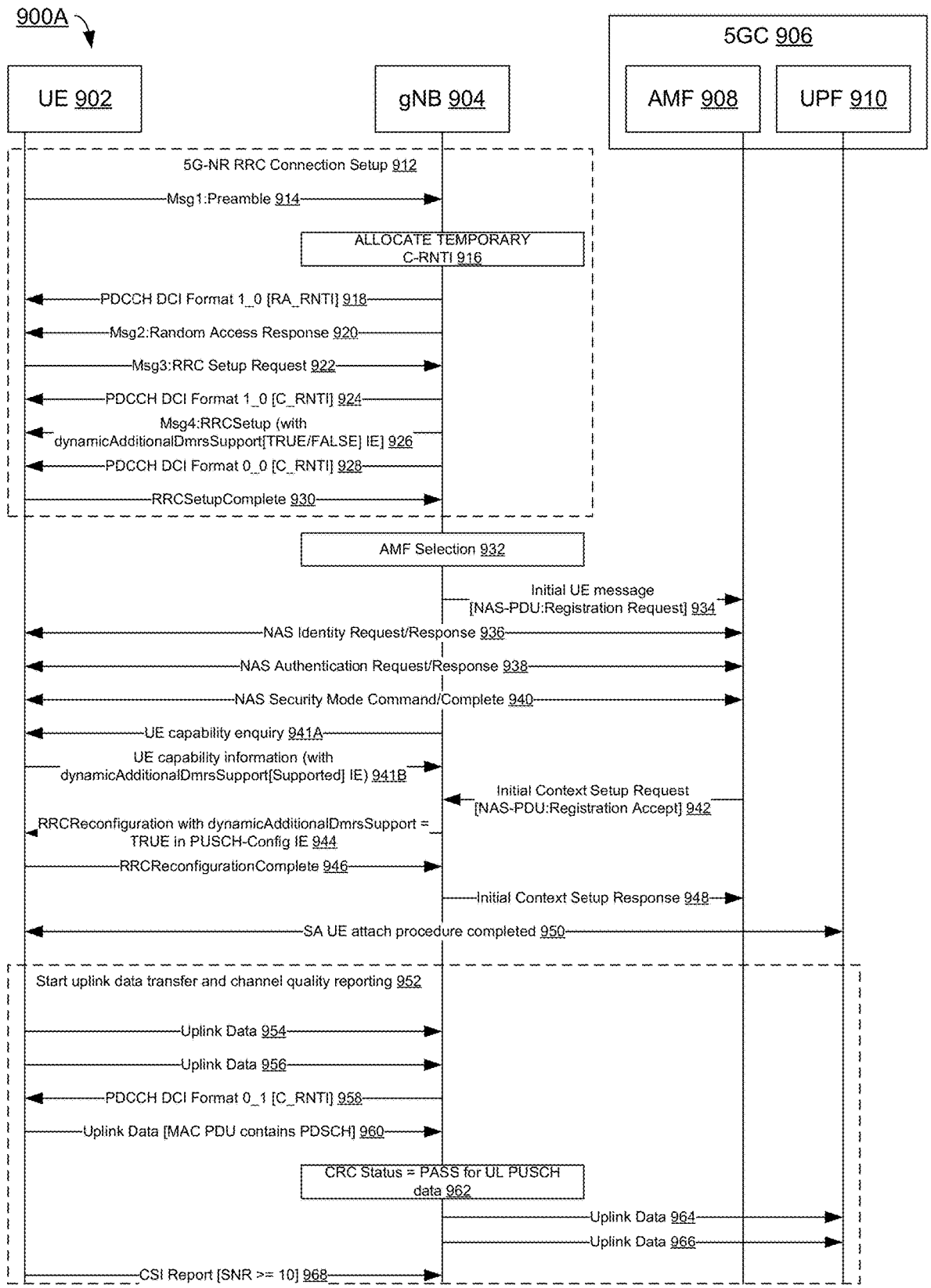
FIGS. 9A and 9B illustrates an example signal flow for dynamic additional DMRS configuration for a uplink, and that can facilitate dynamic additional DMRS configuration in accordance with an embodiment of this disclosure.
Figure 9B:
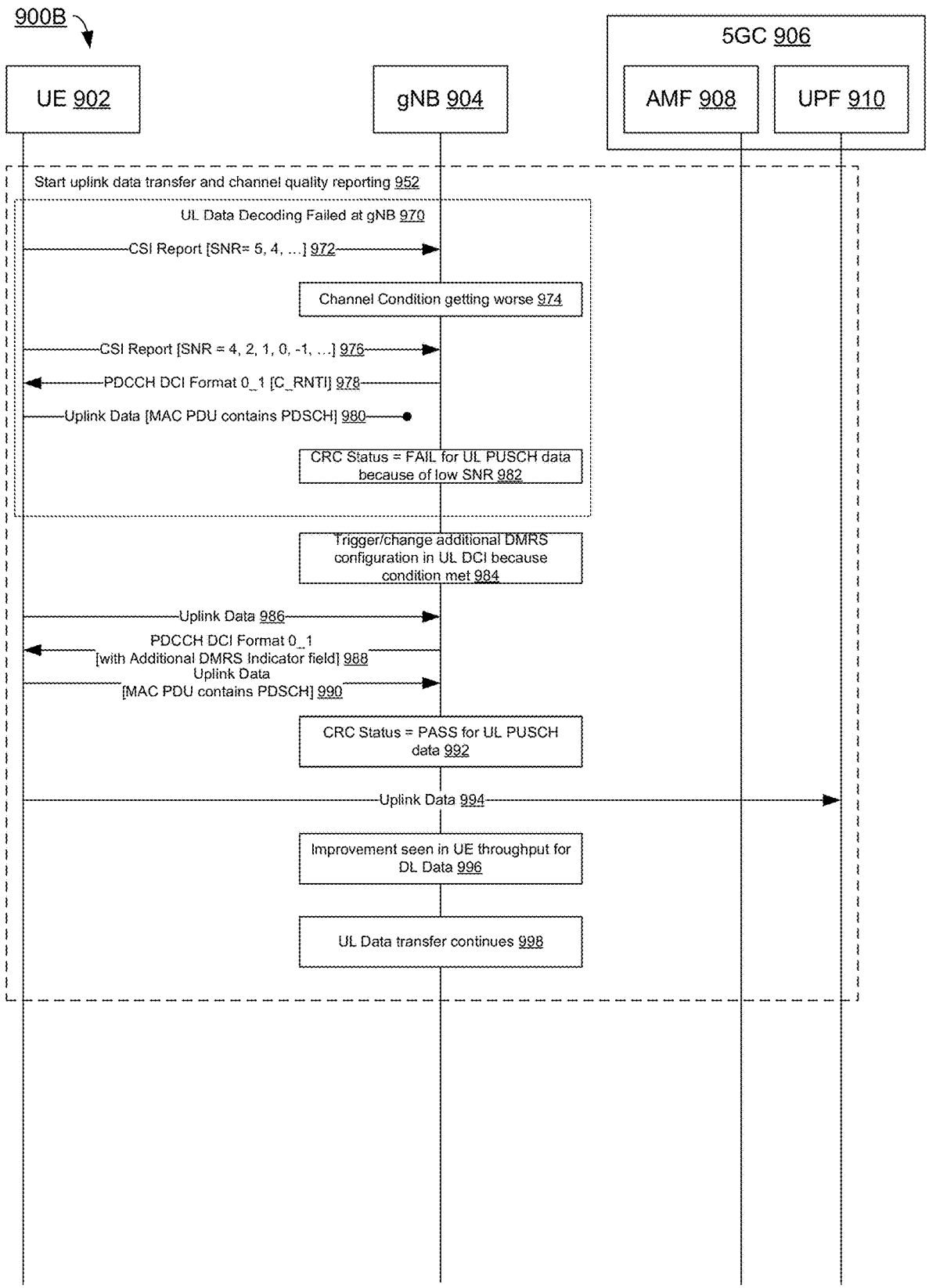

FIG. 9 illustrates an example signal flow for dynamic additional DMRS configuration for a uplink, and that can facilitate dynamic additional DMRS configuration in accordance with an embodiment of this disclosure.

As depicted, in signal flow 900, communications are sent between user equipment 902, gNB 904, and 5GC 906 (which comprises AMF 908 and UPF 910).

The signal flow of signal flow 900 is an example signal flow, and there can be signal flows that implement different signals, or the signals of signal flow 900 in a different order, as part of facilitating dynamic additional DMRS configuration.

As depicted in signal flow 900, the following occurs:
5G-NR RRC connection setup 912
Msg1:Preamble 914
Allocate temporary C-RNTI 916
PDCCH DCI Format 1_0 [RA_RNTI] 918
Msg2:Random Access Response 920
Msg3:RRCSetupRequest 922
PDCCH DCI Format 1_0 [C_RNTI] 924

Msg4:RRCSetup 926, where a dynamicAdditionalDmrs-Support[TRUE/FALSE] IE is contained in this message, and can be added as part of the present techniques PDCCH DCI Format 0_0 [C_RNTI] 928

RRCSetupComplete 930

AMF Selection 932

Initial UE message [NAS-PDU:Registration Request] 934

NAS Identity Request/Response 936

NAS Authentication Request/Response 938

NAS Security Mode Command/Complete 940

UE capability enquiry 941A

UE capability information, with dynamicAdditionalDmrsSupport[Supported] IE in FeatureSetUplink 941B

Initial Context Setup Request [NAS-PDU:Registration Accept] 942

RRCReconfiguration with dynamicAdditionalDmrsSupport=TRUE in PUSCH-Config IE where UE supports this feature in uplink 944

RRCReconfigurationComplete 946

Initial Context Setup Response 948

SA UE attach procedure completed 950

Start uplink data transfer and channel quality reporting 952

Uplink data 954

Uplink data 956

PDCCH DCI Format 0_1 [C_RNTI] 958

Uplink Data [MAC PDU contains PDSCH] 960

CRC status=PASS for UL PUSCH data 962

Uplink data 964

Uplink data 966

CSI Report [SNR>=10] 968

UL data decoding failed at gNB 970

CSI Report [SNR=5, 4, . . . ] 972

Channel condition getting worse 974

CSI Report [SNR=4, 2, 1, 0, −1, . . . ] 976

PDCCH DCI Format 0_1 [C_RNTI] 978

Uplink Data [MAC PDU contains PUSCH] 980

CRC Status=FAIL for UL PUSCH because of low SNR 982

Trigger/change additional DMRS configuration in UL DCI because of a condition 984, where, in some examples, a condition can be UL SNR reporting is bad for a certain threshold and period; UL CRC fails because SNR is low (e.g., BLER is high for a certain threshold and period); UE is on a cell edge; and/or UE is on high mobility Uplink data 986

PDCCH DCI Format 0_1 [with additional DMRS indicator field] 988, where the additional DMRS indicator field can be implemented as part of the present techniques Uplink data [MAC PDU contains PUSCH] 990

CRC Status=PASS for UL PUSCH data 992

Uplink data 994

Improvement seen in CRC Pass for UL Data 996

UL Data transfer continues 998

Figure 8A:
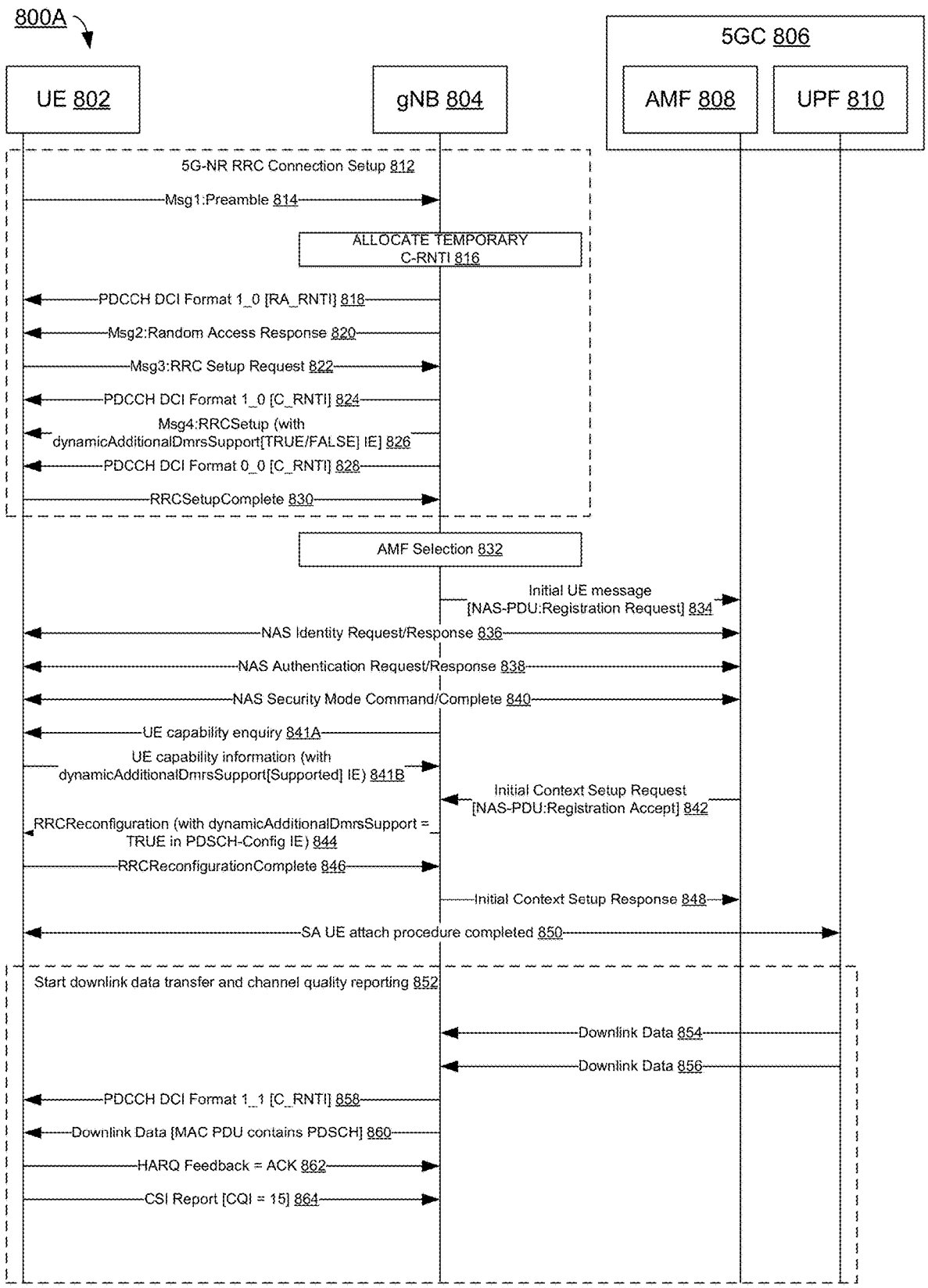
FIGS. 8A and 8B illustrate an example signal flow for dynamic additional DMRS configuration for a downlink, and that can facilitate dynamic additional DMRS configuration in accordance with an embodiment of this disclosure.
Figure 8B:
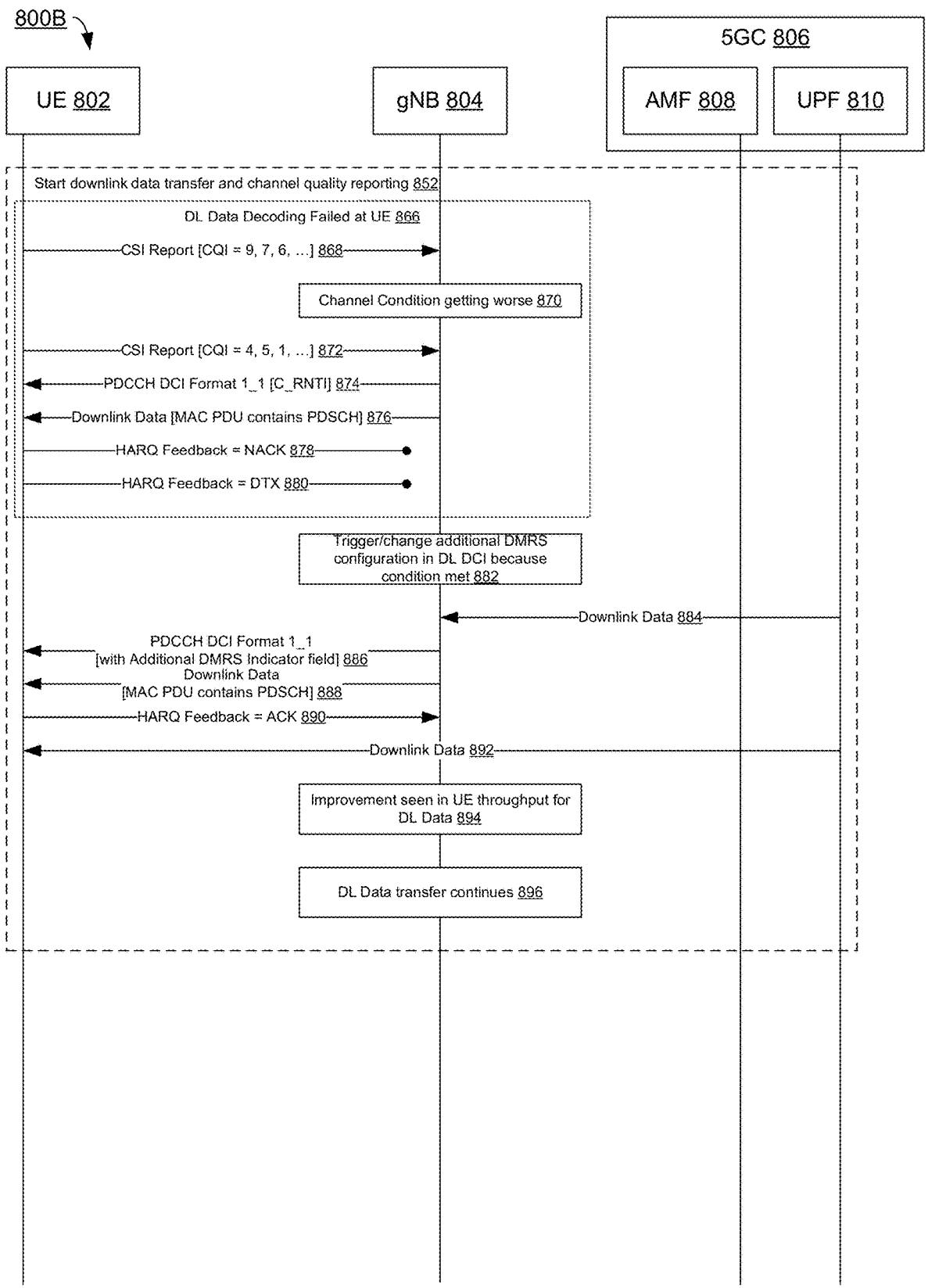

User equipment 902, gNB 904, 5GC 906, AMF 908, and UPF 910 can be similar to user equipment 802, gNB 804, 5GC 806, AMF 808, and UPF 810 of FIGS. 8A and 8B, respectively. Signals 912-950 can be similar to signals 812-850. Additionally, in signals 912-950, an IE dynamicAdditionalDmrsSupport can be available for downlink, and an uplink structure can be different relative to signals 812-850 of FIG. 8A

Example Process Flows

FIG. 10 illustrates an example process flow 1000 that can facilitate dynamic additional DMRS configuration, in accordance with an embodiment of this disclosure. In some examples, one or more embodiments of process flow 1000 can be implemented by gNB 804 of FIGS. 8A and 8B, gNB 904 of FIGS. 9A and 9B, and/or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 1100 of FIG. 11, and/or process flow 1200 of FIG. 12.

Process flow 1000 begins with 1002, and moves to operation 1004. Operation 1004 depicts facilitating first broadband cellular communications between a user equipment and core network equipment that is part of a core network according to a first number of additional demodulation reference signal positions that are configured in radio resource control information. This can comprise a gNB (e.g., gNB 804 of FIGS. 8A and 8B) conducting communications with a UE (e.g., UE 802 of FIGS. 8A and 8B) after the UE has attached to the gNB. This could comprise, for example, gNB 804 sending downlink data 860 to UE 802 (and also the UE sending uplink data to the gNB). The first number of additional demodulation reference signal positions can be the number that are established as part of an attach procedure.

In some examples, facilitating the first broadband cellular communications between the user equipment and the core network equipment using a cellular radio base station. That is, process flow 1000 can be implemented by a 5G NodeB, such as gNB 804 of FIGS. 8A and 8B, and/or gNB 904 of FIGS. 9A and 9B.

After operation 1004, process flow 1000 moves to operation 1006.

Operation 1006 depicts determining to modify the first number of additional demodulation reference signal positions. This can be similar to trigger/change additional DMRS configuration in DL DCI because condition met 882 of FIG. 8B (in a case of modifying additional DMRS configuration for downlink communications) or trigger/change additional DMRS configuration in UL DCI because of a condition 984 of FIG. 9B (in a case of modifying additional DMRS configuration for uplink communication). Where modifying the additional DMRS positions is performed after UE attach where the number of additional DMRS positions is initially set, this can be a dynamic configuration.

In some examples, operation 1006 comprises receiving continuous quality improvement information and hybrid automatic repeat request information from the user equipment. That is, UE can report channel quality using CQI and HARQ feedback (ACK/NACK/DTX) for data transmission. This can be similar to HARQ Feedback=ACK 862 and/or CSI report 864 of FIG. 8A.

In some examples, operation 1006 comprises processing the continuous quality improvement information to a first result, and processing the hybrid automatic repeat request information to a second result. That is, a gNB module OLLA (e.g., OLLA 710 of FIG. 7) can handle HARQ feedback and CQI processing (e.g., CQI processing 706) can handle CQI reported by the UE (e.g., UE 704).

In some examples, operation 1006 comprises determining a modulation coding scheme and the second number of additional demodulation reference signal positions based on the first result and the second result. That is, an ILLA module (e.g., ILLA 708 of FIG. 7) can determine a MCS and additional DMRS position to be applied to uplink and/or downlink data transmission.

In some examples, operation 1006 comprises, based on a determination to increase the modulation coding scheme, determining a lower value for the second number of additional demodulation reference signal positions. That is, an ILLA (e.g., 708 of FIG. 7) can determine a MCS by considering a CQI reported by a UE (e.g., UE 704) and HARQ feedback. Where the MCS is higher that can indicate a better channel/radio quality, so a smaller number of additional DMRS positions can be configured for the UE.

In some examples, operation 1006 comprises, based on a determination to decrease the modulation coding scheme, determining a higher value for the second number of additional demodulation reference signal positions. That is, where an ILLA determines a lower MCS, this can mean that a channel quality reported by a UE is poor, and BLER is high. So, the ILLA can determine to increase the number of additional DMRS reference positions in downlink and/or uplink communications to decrease a BLER percentage.

After operation 1006, process flow 1000 moves to operation 1008.

Operation 1008 depicts, based on determining to modify the first number of additional demodulation reference signal positions, sending, to the user equipment, physical downlink control channel downlink control information that indicates a second number of additional demodulation reference signal positions that are configured in the downlink control information.

After operation 1008, process flow 1000 moves to operation 1010. This can be implemented in a similar manner as PDCCH DCI Format 1_1 [with additional DMRS indicator field] 886 of FIG. 8B (in a case of downlink communications), and/or PDCCH DCI Format 0_1 [with additional DMRS indicator field] 988 of FIG. 9B (in a case of uplink communications).

After operation 1008, process flow 1000 moves to operation 1010.

Operation 1010 depicts facilitating second broadband cellular communications between the user equipment and the core network equipment according to the second number of additional demodulation reference signal positions, wherein a throughput of the second broadband cellular communications is determined as a function of a size of a transport block set based on the second number of additional demodulation reference signal positions. This can comprise using the dynamically configured additional DMRS positions, such as in DL data transfer continues 896 of FIG. 8B (in a case of downlink communications), and/or UL data transfer continues 998 of FIG. 9B (in a case of uplink communications).

After operation 1010, process flow 1000 moves to 1012, where process flow 1000 ends.

FIG. 11 illustrates an example process flow 1100 that can facilitate dynamic additional DMRS configuration, in accordance with an embodiment of this disclosure. In some examples, one or more embodiments of process flow 1100 can be implemented by gNB 804 of FIGS. 8A and 8B, gNB 904 of FIGS. 9A and 9B, and/or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1000 of FIG. 10, and/or process flow 1200 of FIG. 12.

Process flow 1100 begins with 1102, and moves to operation 1104. Operation 1104 depicts determining, based on communicating with a user equipment according to a first number of additional demodulation reference signal positions that are configured in radio resource control data, to modify the first number of additional demodulation reference signal positions. In some examples, operation 1104 can be implemented in a similar manner as operation 1006 of FIG. 10.

In some examples, determining to modify the first number of additional demodulation reference signal positions is performed based on uplink data received from the user equipment. That is, this can be performed for uplink communications, and can be similar to trigger/change additional DMRS configuration in UL DCI because of a condition 984 of FIG. 9B.

In some examples determining to modify the first number of additional demodulation reference signal positions is performed based on determining that an uplink signal-to-noise ratio metric does not satisfy a threshold associated with a predetermined quality criterion for a defined amount of time, determining that a cyclic redundancy check has failed or is failing for uplink data received from the user equipment, determining that the user equipment is connected to edge network equipment of a cellular network via which the broadband cellular communications are conducted, or determining that the user equipment satisfies a defined physical movement criterion. That is, these are example conditions that can trigger trigger/change additional DMRS configuration in UL DCI because of a condition 984 of FIG. 9B.

In some examples, determining to modify the first number of additional demodulation reference signal positions is performed based on downlink data sent to the user equipment. That is, this can be performed for downlink communications, and can be similar to trigger/change additional DMRS configuration in DL DCI because condition met 882 of FIG. 8B.

In some examples, determining to modify the first number of additional demodulation reference signal positions is based on determining that a continuous quality improvement reporting metric does not satisfy a threshold associated with a defined threshold criterion for a defined amount of time. That is, a trigger can be that a CQI reporting metric is poor (e.g., below a threshold value) for a certain amount of time.

In some examples, the second number of additional demodulation reference signal positions is configured for downlink communications, and determining to modify the first number of additional demodulation reference signal positions is based on determining that hybrid automatic feedback is being reported as a negative acknowledgement. That is, the triggering condition can be that HARQ feedback is reported as NACK.

In some examples, the second number of additional demodulation reference signal positions is configured for downlink communications, and wherein determining that hybrid automatic feedback is being reported as the negative acknowledgement is based on a block error rate metric being determined to satisfy a threshold associated with a defined threshold criterion for a defined amount of time. That is, the triggering condition can be that a BLER value is high (e.g., above a predetermined threshold) for a certain amount of time.

In some examples, determining to modify the first number of additional demodulation reference signal positions is based on determining that the user equipment is connected to edge network equipment of a cellular network via which first broadband cellular communications are conducted, or is based on determining that the user equipment satisfies a defined high mobility criterion. That is, the triggering condition can be that the UE is located on a cell edge, or that the UE is in a high-mobility condition.

In some examples, operation 1104 comprises, as part of a connection setup with the user equipment, determining that the user equipment supports dynamically configuring additional demodulation reference signal positions for downlink communications or for uplink communications based on an information element that is communicated within the radio resource control data. That is, an ability to dynamically configure additional DMRS positions can be conveyed in an IE. This IE can be dynamicAdditionalDMRSSupport in FeatureSetDownlink for downlink communications. This IE can be dynamicAdditionalDMRSSupport in FeatureSetUplink for downlink communications.

After operation 1104, process flow 1100 moves to operation 1106.

Operation 1106 depicts, based on determining to modify the first number of additional demodulation reference signal positions, sending, to the user equipment, physical downlink control channel downlink control data that indicates a second number of additional demodulation reference signal positions that are configured in the downlink control data. In some examples, operation 1106 can be implemented in a similar manner as operation 1008 of FIG. 10.

After operation 1106, process flow 1100 moves to operation 1108.

Operation 1108 depicts conducting broadband cellular communications with the user equipment according to the second number of additional demodulation reference signal positions, wherein a throughput of the broadband cellular communications is determined based on a size of a transport block that is set based on the second number of additional demodulation reference signal positions. In some examples, operation 1108 can be implemented in a similar manner as operation 1010 of FIG. 10.

After operation 1108, process flow 1100 moves to 1110, where process flow 1100 ends.

FIG. 12 illustrates an example process flow 1200 that can facilitate dynamic additional DMRS configuration, in accordance with an embodiment of this disclosure. In some examples, one or more embodiments of process flow 1200 can be implemented by gNB 804 of FIGS. 8A and 8B, gNB 904 of FIGS. 9A and 9B, and/or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1000 of FIG. 10, and/or process flow 1100 of FIG. 11.

Process flow 1200 begins with 1202, and moves to operation 1204. Operation 1204 depicts determining, based on communicating with a user equipment according to a first number of additional demodulation reference signal positions, to modify the first number of additional demodulation reference signal positions. In some examples, operation 1204 can be implemented in a similar manner as operation 1006 of FIG. 10.

In some examples, the user equipment is a first user equipment, and determining to modify the first number of additional demodulation reference signal positions is performed independently of a third number of additional demodulation reference signal positions with respect to a second user equipment. That is, dynamically configuring additional DMRS positions can be UE-specific. Where multiple UEs are attached to a gNB, each UE can have its DMRS positions dynamically configured individually.

In some examples, operation 1204 comprises enabling attachment of the user equipment before determining to modify the first number of additional demodulation reference signal positions, where conducting the broadband cellular communications with the user equipment is performed independently of re-attachment of the user equipment. That is, adjusting additional DRMS positions can be performed dynamically during communications after the UE attaches to the gNB, in addition to being initially configured as part of the attach process.

After operation 1204, process flow 1200 moves to operation 1206.

Operation 1206 depicts, based on determining to modify the first number of additional demodulation reference signal positions, sending, to the user equipment, physical downlink control channel downlink control information that indicates a second number of additional demodulation reference signal positions in downlink control information. In some examples, operation 1206 can be implemented in a similar manner as operation 1008 of FIG. 10.

After operation 1206, process flow 1200 moves to operation 1208.

Operation 1208 depicts enabling broadband cellular communications with the user equipment according to the second number of additional demodulation reference signal positions. In some examples, operation 1208 can be implemented in a similar manner as operation 1010 of FIG. 10.

In some examples, the broadband cellular communications are second broadband cellular communications, the second number of additional demodulation reference signal positions is greater than the first number of additional demodulation reference signal positions, and a second throughput of the second broadband cellular communications is less than a first throughput of a first broadband cellular communication that is conducted according to the first number of additional demodulation reference signal positions. That is, data throughput can be inversely proportional to a number of configured additional DMRS positions. Where more additional DMRS positions are used, it can be that there is less data throughput. Similarly, where fewer additional DMRS positions are used, it can be that there is more data throughput.

After operation 1208, process flow 1200 moves to 1210, where process flow 1200 ends.

Example Operating Environment

Figure 13:
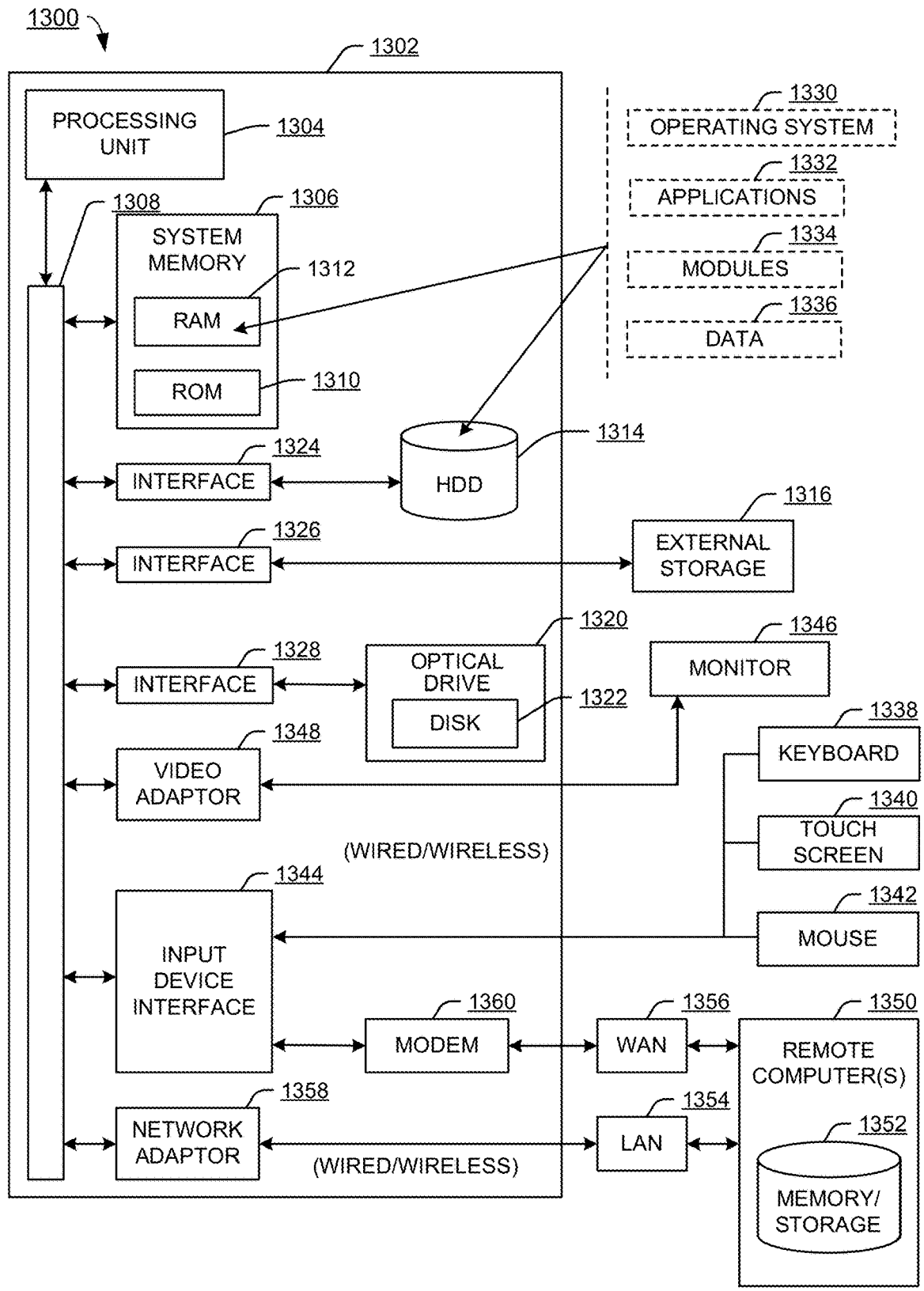
FIG. 13 illustrates an example block diagram of a computer operable to execute an embodiment of this disclosure.

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of dynamic additional DMRS configuration component 310 of FIGS. 3A and 3B; dynamic additional DMRS configuration component 410 of FIGS. 4A and 4B; dynamic additional DMRS configuration component 510 of FIGS. 5A and 5B; dynamic additional DMRS configuration component 610 of FIGS. 6A and 6B; gNB 702 and/or UE 704 of FIG. 7; UE 802, gNB 804, and/or 5GC 806 of FIGS. 8A and 8B; and/or UE 902, gNB 904, and/or 5GC 906 of FIGS. 9A and 9B.

In some examples, computing environment 1300 can implement one or more embodiments of the process flows of FIGS. 10-12 to facilitate dynamic additional DMRS configuration.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory coupled to the processor, comprising instructions that cause the at least one processor to perform operations comprising:
as part of a user equipment attaching to the system, sending, to the user equipment, a message that comprises a first value that indicates that the system is able to support modification of a first number of additional demodulation reference signal positions after the attaching to the system, wherein the message is configured to comprise a second value that indicates that the system is not able to support modification of the first number of additional demodulation reference signal positions after the attaching to the system;
facilitating first broadband cellular communications between the user equipment and core network equipment that is part of a core network according to the first number of additional demodulation reference signal positions that are configured in radio resource control information;
determining to modify the first number of additional demodulation reference signal positions;
based on determining to modify the first number of additional demodulation reference signal positions, sending, to the user equipment, physical downlink control channel downlink control information that indicates a second number of additional demodulation reference signal positions that are configured in the downlink control information; and
facilitating second broadband cellular communications between the user equipment and the core network equipment according to the second number of additional demodulation reference signal positions.

2. The system of claim 1, wherein the operations further comprise:
receiving continuous quality improvement information and hybrid automatic repeat request information from the user equipment.

3. The system of claim 2, wherein the operations further comprise:
processing the continuous quality improvement information to a first result; and
processing the hybrid automatic repeat request information to a second result.

4. The system of claim 3, wherein the operations further comprise:
determining a modulation coding scheme and the second number of additional demodulation reference signal positions based on the first result and the second result.

5. The system of claim 1, wherein the operations further comprise:
based on a determination to increase a modulation coding scheme, determining a lower value for a third number of additional demodulation reference signal positions.

6. The system of claim 4, wherein the operations further comprise:
based on a determination to decrease the modulation coding scheme, determining a higher value for the second number of additional demodulation reference signal positions.

7. The system of claim 1, wherein facilitating the first broadband cellular communications comprises facilitating the first broadband cellular communications between the user equipment and the core network equipment using a cellular radio base station.

8. A method, comprising:
as part of a user equipment attaching to a system comprising at least one processor, sending, by the system and to the user equipment, a message that comprises a first value that indicates that the system is able to support modification of a first number of additional demodulation reference signal positions after the attaching to the system, wherein the message is configured to comprise a second value that indicates that the system is not able to support modification of the first number of additional demodulation reference signal positions after the attaching to the system;
determining, by the system, and based on communicating with the user equipment according to the first number of additional demodulation reference signal positions that are configured in radio resource control data, to modify the first number of additional demodulation reference signal positions;
based on determining to modify the first number of additional demodulation reference signal positions, sending, by the system to the user equipment, physical downlink control channel downlink control data that indicates a second number of additional demodulation reference signal positions that are configured in the downlink control data; and
conducting, by the system, broadband cellular communications with the user equipment according to the second number of additional demodulation reference signal positions.

9. The method of claim 8, wherein determining to modify the first number of additional demodulation reference signal positions is performed based on uplink data received from the user equipment.

10. The method of claim 8, wherein determining to modify the first number of additional demodulation reference signal positions is performed based on determining that an uplink signal-to-noise ratio metric does not satisfy a threshold associated with a predetermined quality criterion for a defined amount of time, determining that a cyclic redundancy check has failed or is failing for uplink data received from the user equipment, determining that the user equipment is connected to edge network equipment of a cellular network via which the broadband cellular communications are conducted, or determining that the user equipment satisfies a defined physical movement criterion.

11. The method of claim 8, wherein determining to modify the first number of additional demodulation reference signal positions is performed based on downlink data sent to the user equipment.

12. The method of claim 8, wherein determining to modify the first number of additional demodulation reference signal positions is based on determining that a continuous quality improvement reporting metric does not satisfy a threshold associated with a defined threshold criterion for a defined amount of time.

13. The method of claim 8, wherein the second number of additional demodulation reference signal positions is configured for downlink communications, and wherein determining to modify the first number of additional demodulation reference signal positions is based on determining that hybrid automatic feedback is being reported as a negative acknowledgement.

14. The method of claim 13, wherein determining that hybrid automatic feedback is being reported as the negative acknowledgement is based on a block error rate metric being determined to satisfy a threshold associated with a defined threshold criterion for a defined amount of time.

15. The method of claim 8, wherein determining to modify the first number of additional demodulation reference signal positions is based on determining that the user equipment is connected to edge network equipment of a cellular network via which the broadband cellular communications are to be conducted, or is based on determining that the user equipment satisfies a defined high mobility criterion.

16. The method of claim 8, further comprising:
as part of a connection setup with the user equipment, determining, by the system, that the user equipment supports dynamically configuring additional demodulation reference signal positions for down link communications or for uplink communications based on an information element that is communicated within the radio resource control data.

17. A non-transitory computer-readable medium comprising instructions that, in response to execution, cause a system comprising at least one processor to perform operations, comprising:
as part of a user equipment attaching to the system, sending, to the user equipment, a message that comprises a first value that indicates that the system is able to support modification of a first number of additional demodulation reference signal positions after the attaching to the system, wherein the message is configured to comprise a second value that indicates that the system is not able to support modification of the first number of additional demodulation reference signal positions after the attaching to the system;
determining, based on communicating with the user equipment according to the first number of additional demodulation reference signal positions, to modify the first number of additional demodulation reference signal positions;
based on determining to modify the first number of additional demodulation reference signal positions, sending, to the user equipment, physical downlink control channel downlink control information that indicates a second number of additional demodulation reference signal positions in downlink control information; and
enabling second broadband cellular communications with the user equipment according to the second number of additional demodulation reference signal positions, wherein a second throughput of the second broadband cellular communications is less than a first throughput of a first broadband cellular communication that is conducted according to the first number of additional demodulation reference signal positions.

18. The non-transitory computer-readable medium of claim 17, wherein the user equipment is a first user equipment, and wherein the determining to modify the first number of additional demodulation reference signal positions is performed independently of a third number of additional demodulation reference signal positions with respect to a second user equipment.

19. The non-transitory computer-readable medium of claim 17, wherein the operations further comprise:
enabling attachment of the user equipment before determining to modify the first number of additional demodulation reference signal positions,
wherein enabling the second broadband cellular communications with the user equipment is performed independently of re-attachment of the user equipment.

20. The non-transitory computer-readable medium of claim 17, wherein the operations further comprise:
receiving continuous quality improvement information and hybrid automatic repeat request information from the user equipment.

* * * * *